(12) United States Patent
Portello et al.

(10) Patent No.: US 11,638,402 B2
(45) Date of Patent: May 2, 2023

(54) SYSTEM AND METHOD FOR CONTROLLING INDOOR FARMS REMOTELY AND USER INTERFACE FOR SAME

(71) Applicant: 80 ACRES URBAN AGRICULTURE, INC., Hamilton, OH (US)

(72) Inventors: Joseph Michael Portello, Fayetteville, AR (US); Michael Zelkind, Hamilton, OH (US); Patricia Livingston, Hamilton, OH (US)

(73) Assignee: 80 ACRES URBAN AGRICULTURE INC., Cincinnati, OH (US)

( * ) Notice: Subject to any disclaimer, the term of this patent is extended or adjusted under 35 U.S.C. 154(b) by 0 days.

(21) Appl. No.: 15/931,358

(22) Filed: May 13, 2020

(65) Prior Publication Data

US 2020/0359570 A1    Nov. 19, 2020

Related U.S. Application Data

(60) Provisional application No. 62/847,195, filed on May 13, 2019.

(51) Int. Cl.
*A01G 9/24* (2006.01)
*A01G 9/18* (2006.01)
(Continued)

(52) U.S. Cl.
CPC .............. *A01G 9/18* (2013.01); *A01G 9/247* (2013.01); *A01G 9/249* (2019.05); *A01G 22/00* (2018.02); *G05B 13/021* (2013.01); *G08C 17/02* (2013.01)

(58) Field of Classification Search
CPC ........... A01G 9/18; A01G 9/249; A01G 9/247
See application file for complete search history.

(56) References Cited

U.S. PATENT DOCUMENTS

| 4,292,762 A | 10/1981 | Fogg et al. |
| 6,578,317 B1 | 6/2003 | Ahm |

(Continued)

FOREIGN PATENT DOCUMENTS

| BE | 901370 A | 4/1985 |
| CN | 102528997 A | 7/2012 |

(Continued)

OTHER PUBLICATIONS

International Search Report and Written Opinion in International Patent Application No. PCT/US20/32719, dated Sep. 1, 2020, in 15 pages.

(Continued)

*Primary Examiner* — Monica L Perry
(74) *Attorney, Agent, or Firm* — Duane Morris LLP

(57) ABSTRACT

A method for receiving, over a computer network, from a plurality of devices installed in an indoor farming module, a plurality of data associated with at least one of: a water level in a watering reservoir, a pH level in an irrigation system, a temperature in the indoor farming module, a humidity level in the indoor farming module, a carbon dioxide level in the indoor farming module, and a power relay status, filtering the received plurality of data on a remote computer based on a filtering field, displaying, in a plurality of panels, the filtered data received from the plurality of devices; configuring a plurality of schedules for the plurality of devices, wherein the plurality of schedules comprise at least one of an irrigation schedule, a lighting schedule, and a data collection schedule, and sending the configured plurality of schedules to one or more controllers of the indoor farming module.

16 Claims, 42 Drawing Sheets

(51) Int. Cl.
  *G08C 17/02* (2006.01)
  *A01G 22/00* (2018.01)
  *G05B 13/02* (2006.01)

(56) References Cited

U.S. PATENT DOCUMENTS

| | | |
|---|---|---|
| 8,782,948 B2 | 7/2014 | Harwood |
| D731,917 S | 6/2015 | Stroot |
| 9,763,382 B2 | 9/2017 | Stroot et al. |
| 9,854,750 B2 | 1/2018 | Brusatore |
| 9,974,252 B2 | 5/2018 | Aykroyd et al. |
| 10,076,090 B2 | 9/2018 | Joseph et al. |
| 10,104,845 B2 | 10/2018 | Cohen et al. |
| 10,182,537 B1 | 1/2019 | Buelow |
| 10,306,847 B2 | 6/2019 | Whitcher et al. |
| 10,506,770 B2 | 12/2019 | Galonska et al. |
| 10,542,685 B2 | 1/2020 | Buelow |
| 10,750,672 B2 | 8/2020 | Buelow |
| 10,801,147 B2 | 10/2020 | Harwood |
| 10,918,021 B1 | 2/2021 | Chen et al. |
| 10,939,623 B2 | 3/2021 | Miyahara et al. |
| 11,388,863 B2 | 7/2022 | Hunter et al. |
| 11,483,981 B1 | 11/2022 | Lo et al. |
| 11,483,988 B2 | 11/2022 | Bertram et al. |
| 2004/0163308 A1 | 8/2004 | Uchiyama |
| 2006/0272210 A1 | 12/2006 | Bissonnette et al. |
| 2007/0100900 A1* | 5/2007 | Gibbins .................. H04Q 9/00 |
| 2011/0041395 A1 | 2/2011 | Newbold et al. |
| 2011/0120002 A1 | 5/2011 | Pettibone |
| 2013/0255146 A1 | 10/2013 | Lehman et al. |
| 2013/0333286 A1 | 12/2013 | Billingsley |
| 2014/0137471 A1 | 5/2014 | Harwood |
| 2014/0231044 A1 | 8/2014 | Duchesne et al. |
| 2014/0326801 A1* | 11/2014 | Upadhyaya .......... G01N 33/246 |
| | | 239/11 |
| 2015/0005964 A1 | 1/2015 | Liotta |
| 2016/0000021 A1 | 1/2016 | Sugimoto |
| 2016/0288991 A1 | 10/2016 | Richardson |
| 2016/0360712 A1 | 12/2016 | Yorio et al. |
| 2017/0027112 A1 | 2/2017 | Vail et al. |
| 2017/0038749 A1 | 2/2017 | Mewes et al. |
| 2017/0118922 A1 | 5/2017 | Sherertz |
| 2017/0300193 A1* | 10/2017 | Ray ....................... G06F 3/0484 |
| 2017/0332544 A1 | 11/2017 | Conrad et al. |
| 2017/0339846 A1 | 11/2017 | Lawrence et al. |
| 2018/0007845 A1* | 1/2018 | Martin ................... A01G 7/045 |
| 2018/0014469 A1 | 1/2018 | Buelow |
| 2018/0014486 A1 | 1/2018 | Creechley et al. |
| 2018/0027282 A1* | 1/2018 | Hirschfeld ............. G11B 27/34 |
| | | 715/716 |
| 2018/0035625 A1 | 2/2018 | Lindbo et al. |
| 2018/0132441 A1 | 5/2018 | Harker et al. |
| 2018/0168111 A1 | 6/2018 | Yasukur |
| 2018/0213735 A1 | 8/2018 | Vail et al. |
| 2018/0235156 A1 | 8/2018 | Blair et al. |
| 2018/0343810 A1 | 12/2018 | Counne |
| 2018/0359937 A1 | 12/2018 | Millar |
| 2018/0359947 A1 | 12/2018 | Millar et al. |
| 2019/0259108 A1* | 8/2019 | Bongartz ............... A01C 21/005 |
| 2019/0335676 A1 | 11/2019 | Solomon et al. |
| 2019/0380283 A1 | 12/2019 | Chong |
| 2020/0037521 A1* | 2/2020 | DeJarnette ............ B05B 12/004 |
| 2020/0214226 A1 | 7/2020 | Yukawa |
| 2020/0214228 A1 | 7/2020 | Cho et al. |
| 2020/0236871 A1 | 7/2020 | Travaglini |
| 2020/0260673 A1 | 8/2020 | Travaglini |
| 2020/0352113 A1 | 11/2020 | Canipe et al. |
| 2020/0359570 A1 | 11/2020 | Portello et al. |
| 2021/0100173 A1 | 4/2021 | Khwaja et al. |
| 2021/0137022 A1 | 5/2021 | Fuse et al. |
| 2021/0137028 A1 | 5/2021 | Zelkind et al. |
| 2022/0007589 A1 | 1/2022 | Binney et al. |
| 2022/0108441 A1* | 4/2022 | Burgo ...................... G06T 7/90 |

FOREIGN PATENT DOCUMENTS

| | | |
|---|---|---|
| CN | 106561347 A | 4/2017 |
| EP | 3076782 A1 | 10/2016 |
| EP | 3326452 A1 | 5/2018 |
| EP | 3837967 A1 | 6/2021 |
| GB | 2152205 | 7/1985 |
| JP | H0923762 A | 1/1997 |
| JP | 2001016981 A | 1/2001 |
| JP | 2001161185 A | 6/2001 |
| JP | 2004065265 A | 3/2004 |
| JP | 2006252105 A | 9/2006 |
| JP | 3156190 U | 12/2009 |
| JP | 2015500040 A | 1/2015 |
| JP | 2015501157 A | 1/2015 |
| JP | 2018023344 A | 2/2018 |
| JP | 2019514145 A | 5/2019 |
| KR | 101690113 B1 | 1/2017 |
| KR | 102069121 B1 | 1/2020 |
| WO | 2003041489 A1 | 5/2003 |
| WO | 2005079557 A1 | 9/2005 |
| WO | 2012005121 A1 | 1/2012 |
| WO | 2013113096 A1 | 8/2013 |
| WO | 2014128746 A1 | 8/2014 |
| WO | 2016166311 A1 | 10/2016 |
| WO | 2017062918 A1 | 10/2016 |
| WO | 2016205634 A1 | 12/2016 |
| WO | 2017024353 A1 | 2/2017 |
| WO | 2017026390 A1 | 2/2017 |
| WO | 2017191819 A1 | 11/2017 |
| WO | 2017205523 A1 | 11/2017 |
| WO | 2017208906 A1 | 12/2017 |
| WO | 2018010946 A1 | 1/2018 |
| WO | 2018035314 A1 | 2/2018 |
| WO | 2018136008 A1 | 7/2018 |
| WO | 2019183734 A1 | 3/2019 |
| WO | 2019077569 A1 | 4/2019 |
| WO | 2019077571 A1 | 4/2019 |
| WO | 2019089800 A1 | 5/2019 |
| WO | 2019173876 A1 | 9/2019 |
| WO | 2019176070 A1 | 9/2019 |
| WO | 2019183244 A2 | 9/2019 |
| WO | 2020005317 A1 | 1/2020 |
| WO | 2020076735 A1 | 4/2020 |
| WO | 2020092503 A1 | 5/2020 |
| WO | 2020092506 A1 | 5/2020 |
| WO | 2020112610 A1 | 6/2020 |
| WO | 2020132634 A1 | 6/2020 |
| WO | 2021037901 A1 | 8/2020 |
| WO | 2021055257 A1 | 3/2021 |
| WO | 2021072550 A1 | 4/2021 |
| WO | 2021202827 A1 | 10/2021 |
| WO | 2021219837 A1 | 11/2021 |

OTHER PUBLICATIONS

U.S. Appl. No. 13/123,842, filed Apr. 13, 2011, Van Gemert et al.
AVF+ Product Description, "AVF+ Vertical Farming," Artechno Growsystems, Pastoor Verburghlaan 20a, 2678 NE, De Lier, The Netherlands, 2018, 8 pages.
International Search Report and Written Opinion in International Patent Application No. PCT/US20/32218, dated Jul. 30, 2020, in 11 pages.
International Search Report and Written Opinion in International Patent Application No. PCT/US20/60609, dated Feb. 11, 2021, in 14 pages.
Partial European Search Report for European Patent Application No. 20802692.2, dated Dec. 20, 2022, 16 pages.

* cited by examiner

740

Select Materials

Only items with stock in Odoo will show up

Seeds

742

Media

744

SYSTEM AND METHOD FOR CONTROLLING INDOOR FARMS REMOTELY AND USER INTERFACE FOR SAME

This application claims the benefit of U.S. Provisional Patent Application No. 62/847,195, filed May 13, 2019, which is incorporated by reference herein in its entirety.

TECHNICAL FIELD

The invention relates to systems and methods for remotely controlling operational and environmental parameters of indoor farms.

BACKGROUND

Global food production systems need to address significant challenges in the coming decades. Finding ways to feed a growing global population whilst reducing environmental impact of agricultural activities is of critical importance. Controlled environment agriculture (CEA), also known as vertical indoor farming, offers a realistic alternative to conventional production for some crops. Vertical indoor farming allows for faster, more controlled production, irrespective of season. Further, vertical indoor farming is not vulnerable to other environmental variability such as pests, pollution, heavy metals, and pathogens. Vertical indoor farming can also reduce environmental impact offering no loss of nutrient, reduced land requirement, better control of waste, less production loss, reduced transportation cost, and reduced clean water usage. Therefore, vertical indoor farming can help to address the significant challenges.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the invention that various modifications to the disclosed embodiments can be made while remaining within the scope of the invention.

In some embodiments, a user interface (UI) is provided on a remote computer that allows a user at a remote location where the remote computer is located to monitor and control various operations of an indoor farm. Examples of such operations include: removing from or inserting into an indoor farming module trays containing crops; starting or stopping irrigation of crops within an indoor farming module; adjusting the temperature, humidity and/or lighting within an indoor farming module, etc.

BRIEF DESCRIPTION OF THE DRAWINGS

Aspects of the invention are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1A:
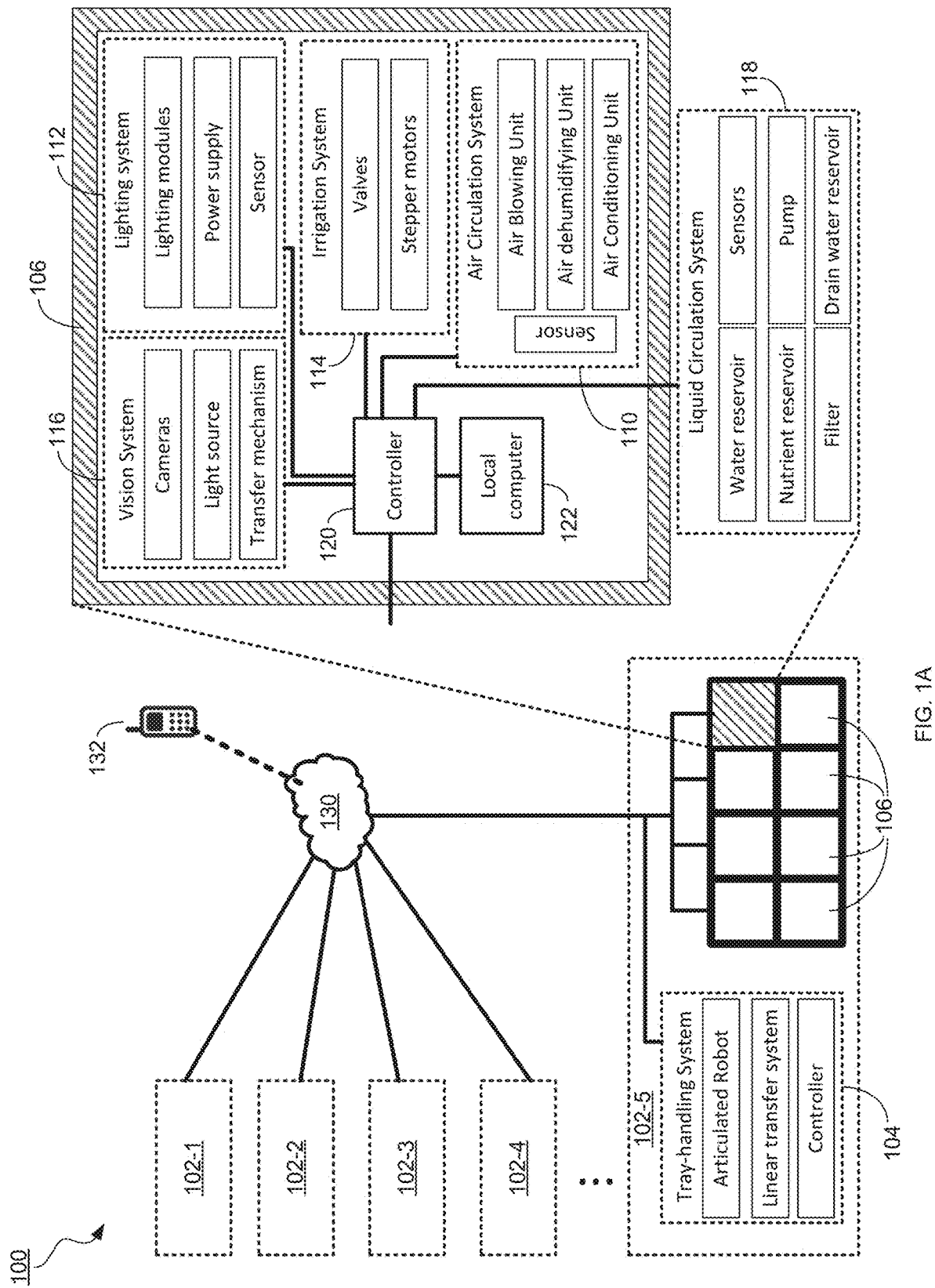
FIG. 1A illustrates a system block diagram of a system of monitoring and controlling operational and environmental parameters of one or more indoor farming modules from a remote location, in accordance with some embodiments of the invention.

Various exemplary embodiments of the invention are described below with reference to the accompanying figures to enable a person of ordinary skill in the art to make and use the invention. As would be apparent to those of ordinary skill in the art, after reading the invention, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates a system block diagram of a system 100 of monitoring and controlling operational and environmental parameters of one or more indoor farming modules from a remote location, in accordance with some embodiments of the invention. It is noted that the system 100 is merely an example, and is not intended to limit the invention. Accordingly, it is understood that additional functional blocks may be provided in or coupled to the system 100 of FIG. 1A, and that some other functional blocks may be omitted or only briefly described herein. It should be also noted that the functionalities provided in each of the components and modules of the system 100 can be combined or separated into one or more modules.

In some embodiments, the system 100 comprises a plurality of indoor farming facilities 102, i.e., a first indoor farming facility 102-1, a second indoor farming facility 102-2, a third indoor farming facility 102-3, a fourth indoor farming facility 102-4, and a fifth indoor farming facility 102-5. In some embodiments, each of the plurality of indoor farming facilities 102 comprises a tray-handling system 104 and at least one indoor farming modules 106. In the illustrated embodiments, the fifth indoor farming facility 102-5 comprises 8 indoor farming modules 106 arranged in 4 columns and each column comprises 2 stacked indoor farming modules 106. In some embodiments, each of the plurality of indoor farming facilities is further coupled to a remote computer 132 through a communications network 130 (e.g., the Internet). In some embodiments, the remote computer 132 is a mobile device. In alternative embodiments, the remote computer 132 comprises at least one server computer coupled to a database for storing environmental parameters and other data and instructions for analyzing data information provided by each of the sub-systems in each of the indoor farming modules 106 and thereafter provide further instructions for automatically monitoring and controlling the operation of the indoor farming module 106 described above.

In the illustrated embodiments, the tray-handling system 104 is designed for automatically loading and unloading carts through a first end of the indoor farming module 106. In the illustrated embodiment, the tray-handling system 104 comprises an articulated robot, a linear transfer system, and a robot controller. In some embodiments, the tray-handling system 104 is configured to transfer a predetermined cart from the chassis in the indoor farming module 106 to a predetermined position (e.g., a storage rack). In some embodiments, when inserting new crops into the indoor farming module 106, the tray-handling system 104 is configured to transfer a predetermined cart from the storage rack to the chassis of the indoor farming module 106.

In some embodiments, the indoor farming module 106 comprises at least one of the following sub-systems: an air circulation system 110, a lighting system 112, an irrigation system 114, a liquid circulation system 118, a controller 120, and a local computer 122. In some embodiments, the liquid circulation system 118 is configured outside of the indoor farming module 106. In some embodiments, the liquid circulation system 118 can be shared by two stacked indoor farming modules 106 and controlled by one of the controllers 120 of the indoor farming modules 106.

In some embodiments, the air circulation system 110 comprises an air blowing unit, an air conditioning unit, an air dehumidifying unit. In some embodiments, the air circulation system 110 further comprises a drop ceiling for air flow regulation. In some embodiments, the air blowing unit, the air conditioning unit, the air dehumidifying unit, and the drop ceiling are configured to provide effective regulation of humidity, CO2 level, air flow, and temperature for a plurality of plants on each of the plurality of carts at different tiers of the chassis in a grow zone of the indoor farming module 106.

In some embodiments, the irrigation system 114 comprises a plurality of liquid supply conduits, a plurality of liquid return conduits, a plurality of drainage conduits, and a plurality of liquid distribution tube assemblies. In some embodiments, the irrigation system 114 further comprises valves and stepper motors for controlling the position of the plurality of liquid distribution tube assemblies. In some embodiments, the irrigation system 114 is directly coupled to the liquid circulation system 118.

In further embodiments, the liquid circulation system 118 can include a drainage water reservoir, at least one filter, at least one water reservoir, at least one nutrient reservoir, pumps, a plurality of sensors and a plurality of control units. In some embodiments, the plurality of sensors comprises a temperature sensor, a conductivity sensor, and an O2 level sensor. In some embodiments, the plurality of control units comprises at least one of the following: a temperature control unit, a pH control unit, an oxygen-level control unit, each operatively coupled to the plurality of liquid supply conduits and/or the plurality of liquid return conduits for controlling the contents and characteristics (e.g., temperature, pH, etc.) of the liquid flowing through the irrigation system 114. In some embodiments, the liquid circulation system 118 regulates a nutrient level, an oxygen level, a pH level, a temperature and a particle level in the irrigation liquid to support the growth of plants in the trays of the indoor farming module 106.

In the illustrated embodiment, the lighting system 112 comprises a plurality of lighting modules and each of the plurality of lighting modules comprises at least one of the following photon sources: an incandescent light, a fluorescent light, a halogen light, a high pressure sodium light, a plasma light, and a light-emitting diode (LED) light, so as to provide photons for the photosynthetic reactions in plants. In some embodiments, the photon sources are selected according to a desired light spectrum for the plants. In some embodiments, the lighting system 112 further comprises at least one power supply to power the plurality of lighting modules. In some embodiments, the at least one power supply can be controlled so as to regulate the light intensity, uniformity and light spectrum to provide a desired illumination to the plants in the indoor farming module 106. In some embodiments, the lighting system 112 can further include a plurality of optical sensors for measuring the light intensity, uniformity and light spectrum.

In some embodiments, the indoor farming module 106 further comprises a vision system 116. In some embodiments, the vision system 116 comprises at least one camera and at least one light source. In some embodiments, the vision system 116 is configured outside of the indoor farming module 106 for security purposes. In some embodiments, the vision system 116 can be also configured in the indoor farming module 106 for monitoring the growth of the plants.

Figure 1B:
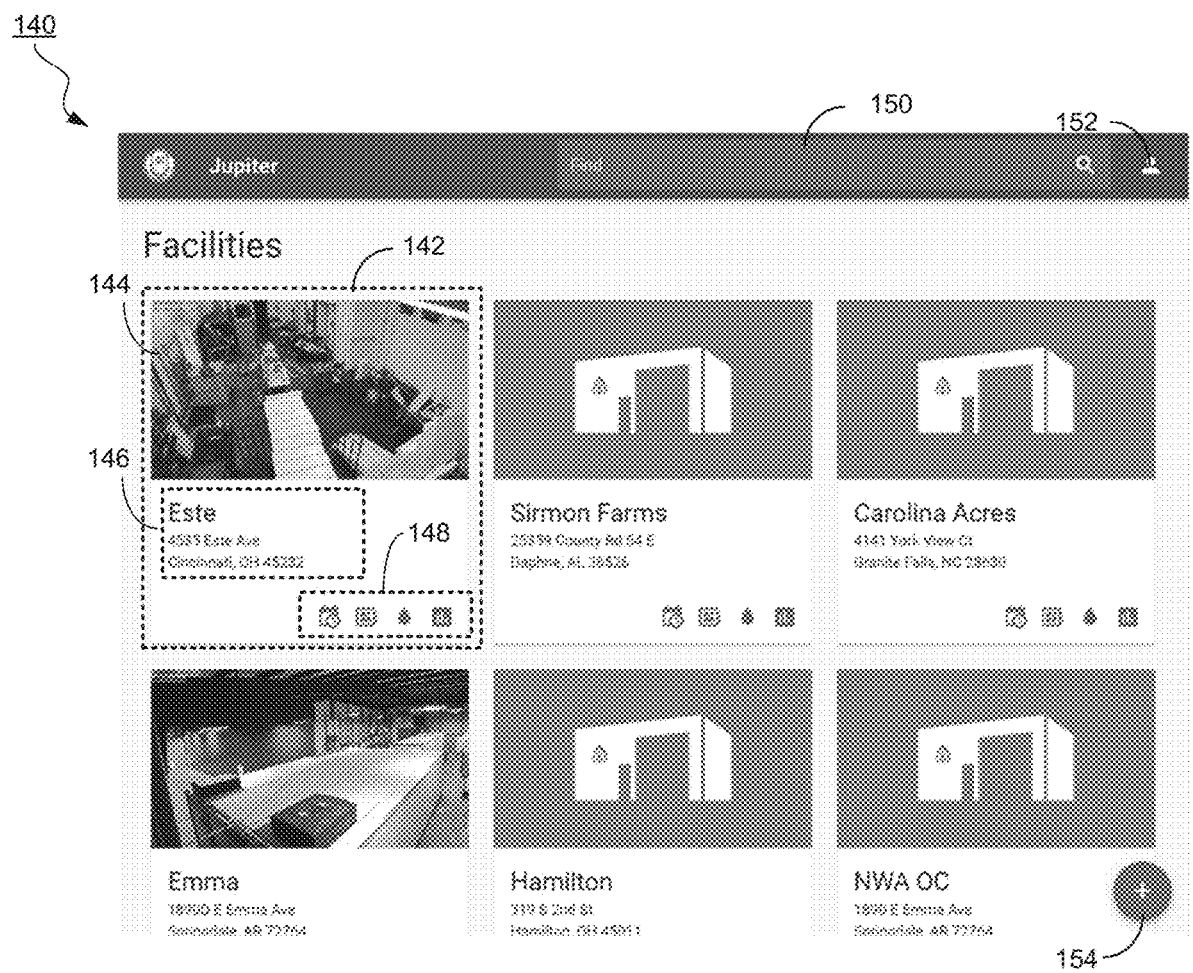
FIG. 1B illustrates an exemplary user interface of a homepage of a facility management system, in accordance with some embodiments of the invention.

FIG. 1B illustrates an exemplary user interface 140 of a homepage of a facility management system, in accordance with some embodiments of the invention. In the illustrated embodiment of FIG. 1B, the user interface 140 lists all facilities that can be accessed by an authorized user at a local computer or via remote device such as remote computer 132. In some embodiments, the authorized user logged in to this facility management system has access to a plurality of facilities shown in corresponding panels 142. In the illustrated embodiment, there is six panels 142 corresponding to six facilities. In some embodiments, each of the six panels 142 comprises an image 144 of the facility, a name and address 146 of the facility, a plurality of icons 148 for quick navigation to schedules, devices, and reports of the corresponding facility. In some embodiments, a first icon is configured for accessing the schedules of the devices in the facility. For example, the schedules comprises at least one of the following: an irrigation schedule, a lighting schedule, and a data collection schedule of a sensor. In some embodiments, a second icon is configured for accessing the devices for device readings and/or controlling the operation of some devices. For example, the devices in a facility comprises at least one of the following: a water level sensor in a watering reservoir, a pH sensor in the irrigation system, a conductivity sensor in the irrigation system, a temperature sensor in an indoor farming module of a facility, a CO2 sensor in an indoor farming module, a humidity sensor, and a power relay. In some embodiments, a third icon is configured for accessing the irrigation system in a facility. In some embodiments, a fourth icon is configured for accessing a report from a particular facility and/or a particular device of a facility. In some embodiments, the user interface 140 of the home page of the facility management system further comprises a search field 152 for quick locating of a specific facility and/or a specific module in the facility. In some embodiments, the user interface 140 further comprises a user information icon 152 of the authorized user. In some embodiments, the user interface 140 also allows the authorized user to add a new facility through an icon 154.

Figure 2:
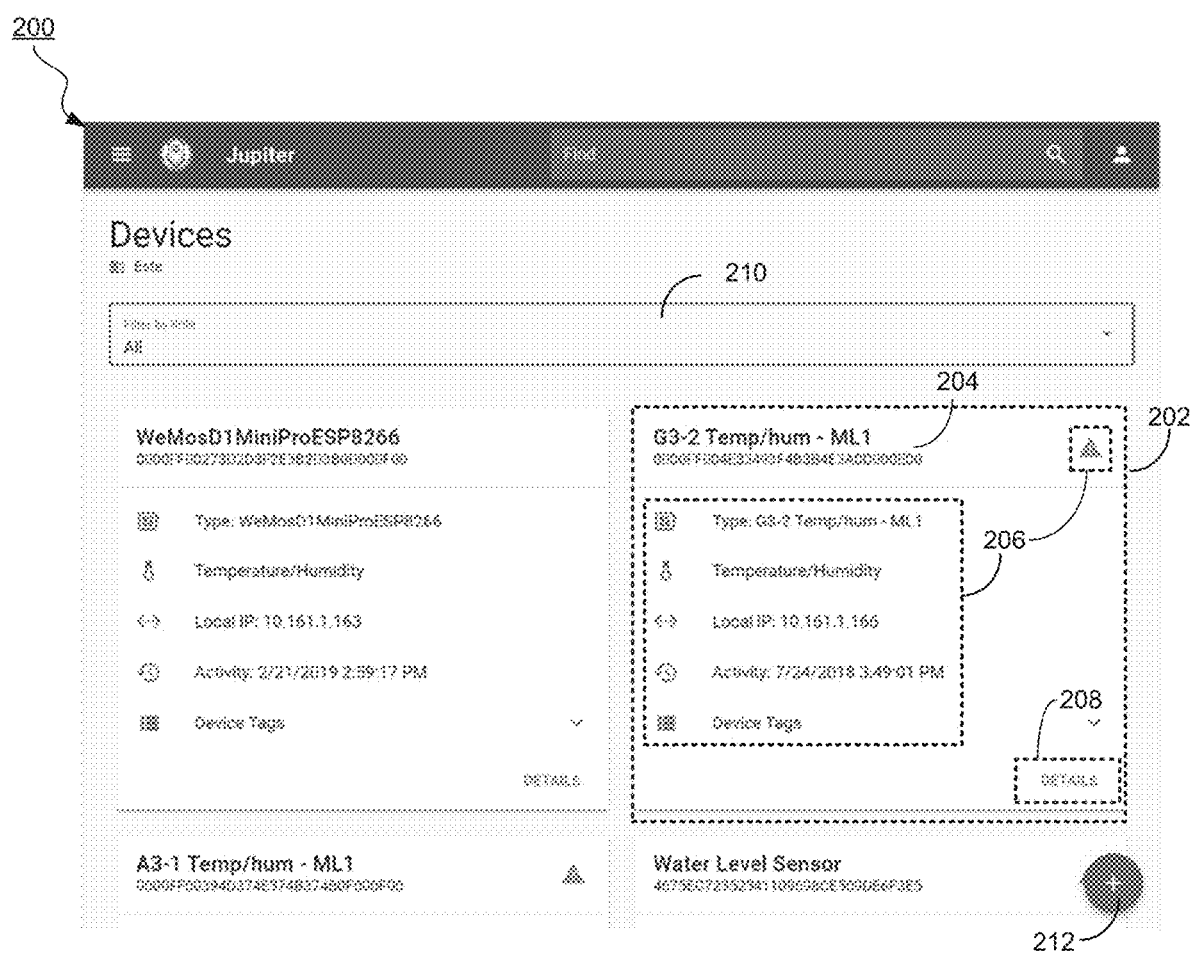
FIG. 2 illustrates an exemplary user interface of a device page of a facility management system, in accordance with some embodiments of the invention.

FIG. 2 illustrates an exemplary user interface 200 of a device page of a facility management system, in accordance with some embodiments of the invention. In the illustrated embodiment, the user interface 200 comprises a plurality of devices associated with a corresponding facility. An authorized user can access interface 200 on a local computer at the facility or via remote device such as remote computer 132 of FIG. 1A. In some embodiments, the user interface 200 comprises a plurality of panels 202 and each of the plurality of panels 202 comprises a name 204 of the device, and an information list 206 of the device. In some embodiments, the information list 206 comprises at least one of the following: a type of the device, status, an IP address, a recent activity, and a device tag. In some embodiments, each of the plurality of panels 202 comprises a link 208 to details of the device. In some embodiments, the user interface 200 further comprises a filter field 210, which is configured to filter the plurality of devices according to a function. In some embodiments, the user interface 100 also allows an authorized user to add a new device through an icon 212.

Figure 3A:
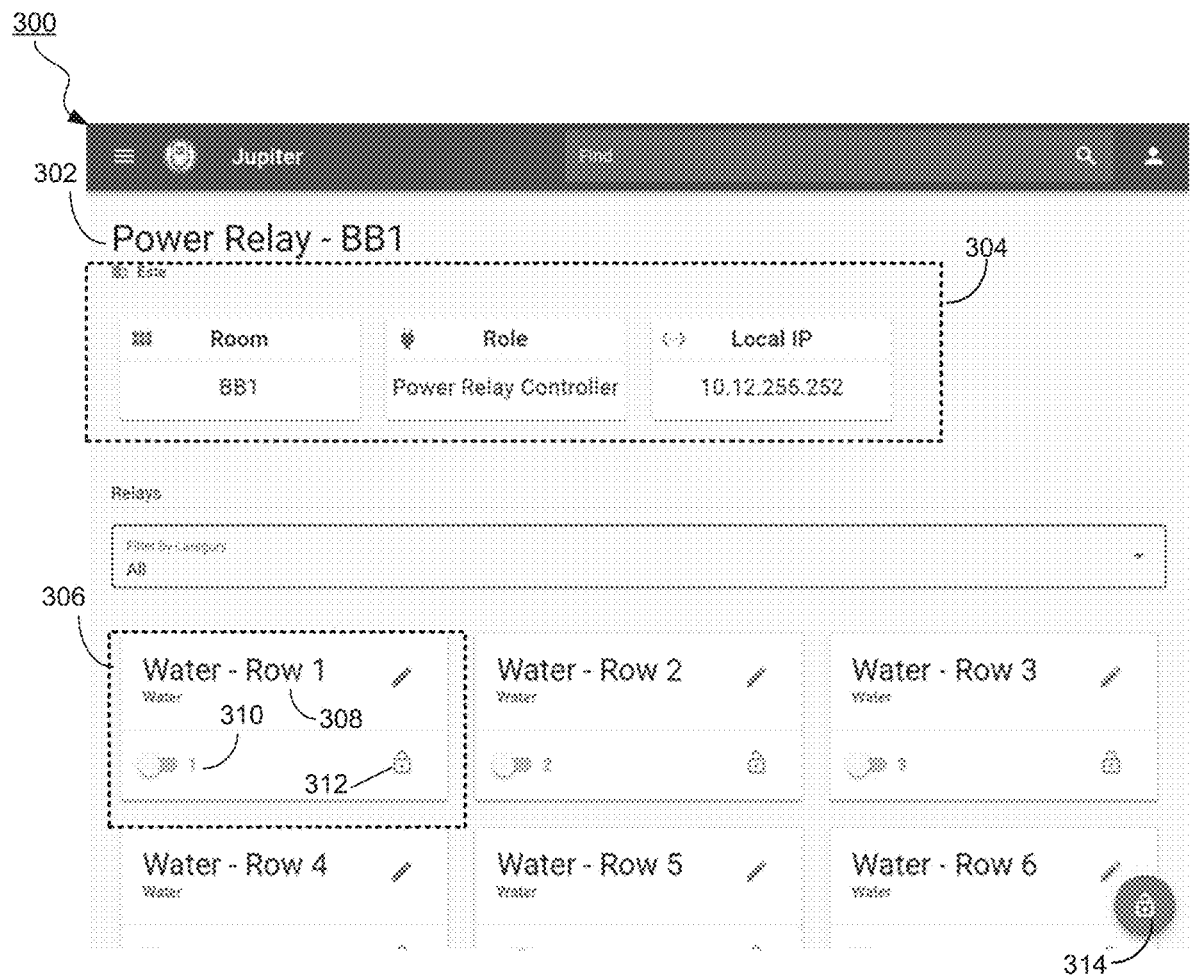
FIG. 3A illustrates an exemplary user interface for controlling and monitoring a power relay in a facility management system, in accordance with some embodiments of the invention.

FIG. 3A illustrates an exemplary user interface 300 of a Power Relay in a facility management system, in accordance with some embodiments of the invention. In some embodiments, the power relay is a physical device which is configured to control a plurality of power supplies to a plurality of corresponding devices, including, a water pump, a valve, a light source, a sensor, and an air dehumidifying unit. An authorized user can access interface 300 at a local computer or via remote device such as remote computer 132 of FIG. 1A. In the illustrated embodiments, the user interface 300 of a power relay comprises a name 302 of the power relay, an information list 304 of the power relay, and a plurality of devices 306 controlled by the power relay. In the illustrated embodiment, the user interface 300 further comprises 6 panels 306. Each of the 6 panels 306 comprises a name of the device 308 and a button 310 to turn on or off the device. In the illustrated embodiments, the power relay is configured to control 6 watering valves of 6 different rows for irrigating plants in a plurality of carts in an indoor farming module of a facility. In some embodiments, each of the 6 panels 306 further comprises a lock button 312 that locks the current relay on/off status and ignores the upcoming schedule until the relay is unlocked. In some embodiments, the user interface 300 further comprises a system lock bottom 314, which locks the entire page and prevents manual changes of the relay status, turning the interface 300 into a view only page.

Figure 3B:
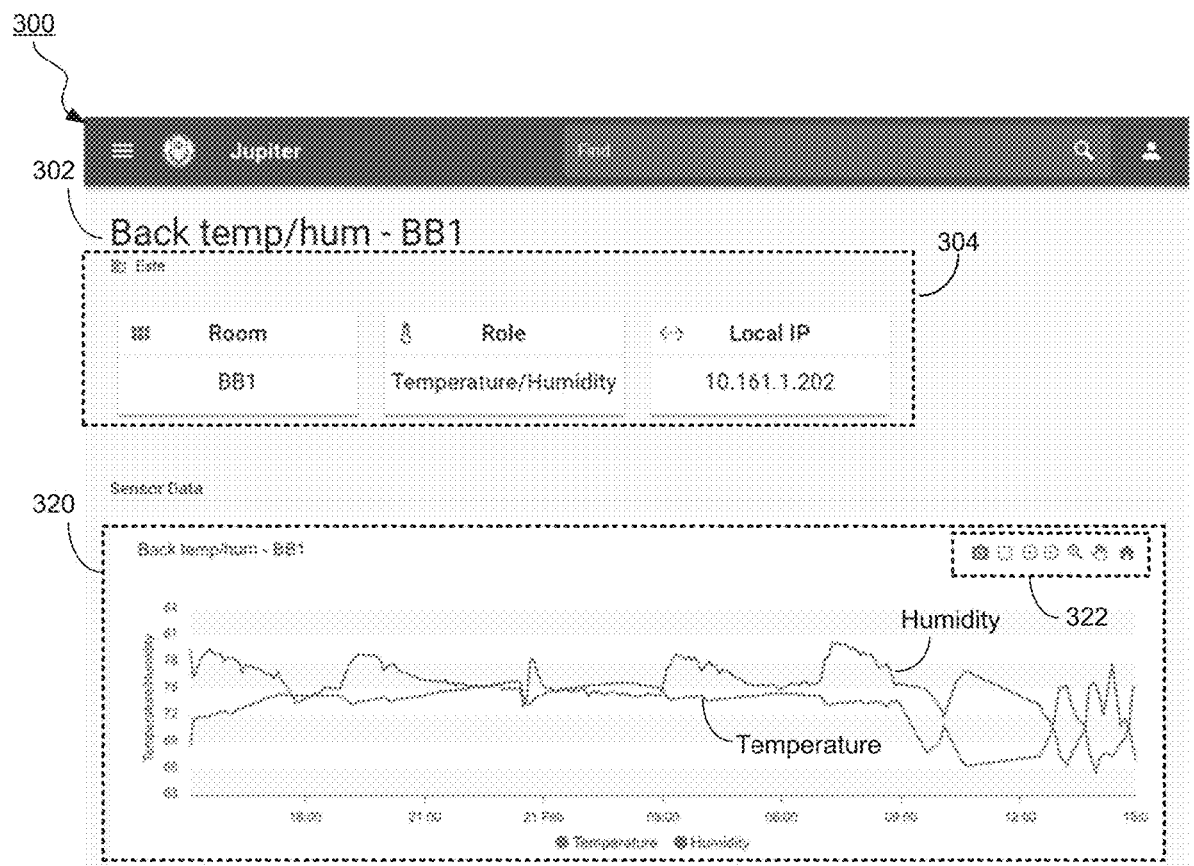
FIG. 3B illustrates an exemplary user interface for controlling and monitoring temperature/humidity sensor in a facility management system, in according to some embodiments of the invention.

FIG. 3B illustrates an exemplary user interface 300 of temperature/humidity sensor in a facility management system, in according to some embodiments of the invention. In some embodiments, the user interface 300 of the temperature/humidity sensor comprises a name 302, an information list of the temperature/humidity sensor, and a diagram 320 of temperature and humidity data in a predefined period of time. In the illustrated embodiment, the diagram 320 illustrates a first curve of recorded temperatures and a second curve of recorded humidity levels from the temperature/humidity sensor. In some embodiments, the diagram 320 further comprises a control panel 322 with a plurality of functional buttons.

Figure 4A:
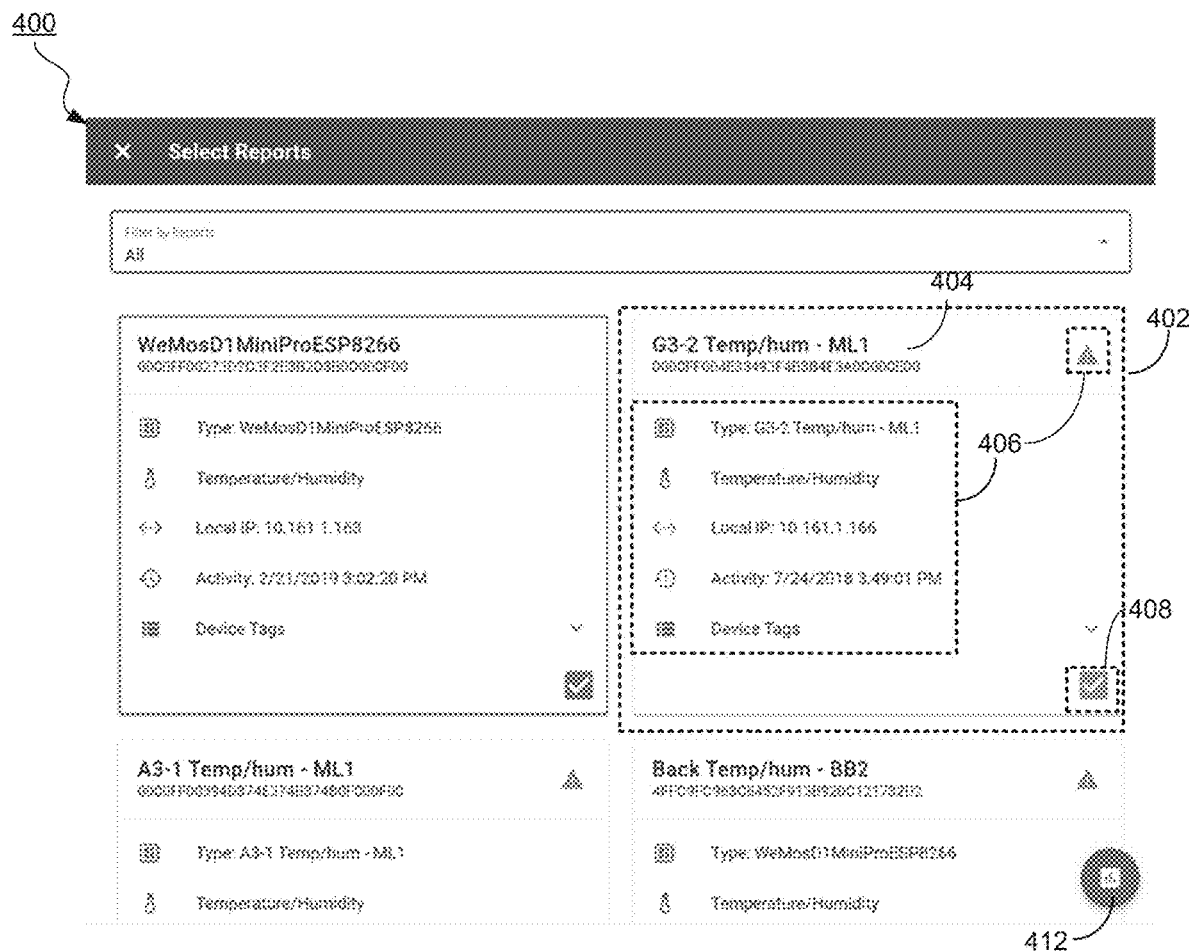
FIG. 4A illustrates an exemplary user interface of reports in a facility management system, in accordance with some embodiments of the invention.

FIG. 4A illustrates an exemplary user interface 400 of reports in a facility management system, in accordance with some embodiments of the invention. In some embodiments, the user interface 400 comprises a plurality of panels 402 and each of the plurality of panels 402 comprises a name 404 of a device and an information list 406 of the device. In some embodiments, the user interface 400 is configured to allow an authorized user to compile measurement data from at least one selected devices in a facility. In some embodiments, measurement data from a first device and a second device is selected in a report as indicated in a check box 408. In some embodiments, the authorized user after selecting corresponding devices by highlighting the check boxes 408 of the corresponding devices in the panels 402, can further use a button 412 to generate the report.

Figure 4B:
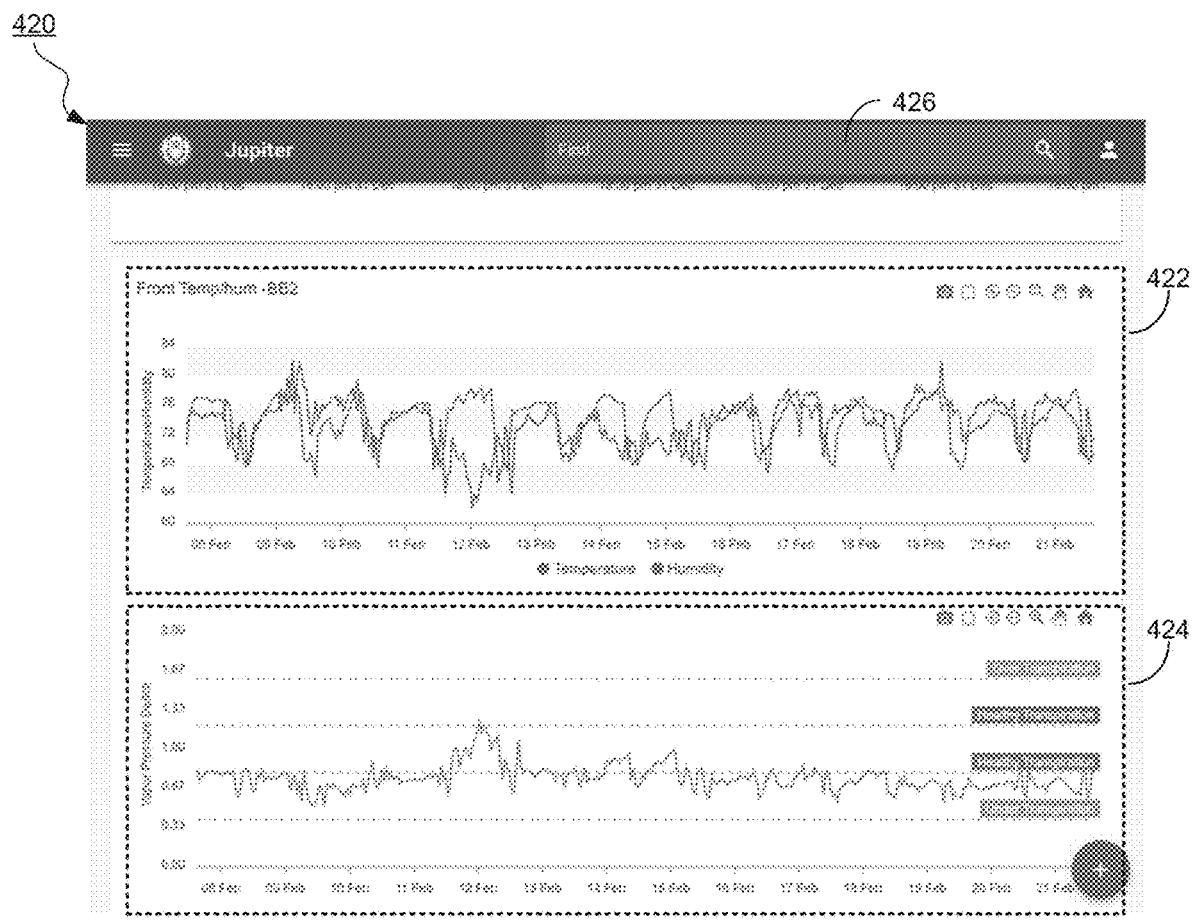
FIG. 4B illustrates an exemplary user interface of reports in a facility management system, in accordance with some embodiments of the invention.

FIG. 4B illustrates an exemplary user interface 420 of reports in a facility management system, in accordance with some embodiments of the invention. In the illustrated embodiment, a report comprises two diagrams 422 and 424, wherein a first diagram 422 comprises two curves of temperature and humidity measured from the first device in a facility and a second diagram 424 that charts the level of transpiration in a grow zone in a facility. The level of transpiration is an indication of plant health and diagram 424 uses temperature and humidity data to track the environmental conditions and compare them to target environmental conditions. In some embodiments, measurement data from the first device and the second device can be compared. In some embodiments, the user interface 420 further comprises a filter box 426 which allows the authorized user to change a date range, e.g., from hours to years.

Figure 5A:
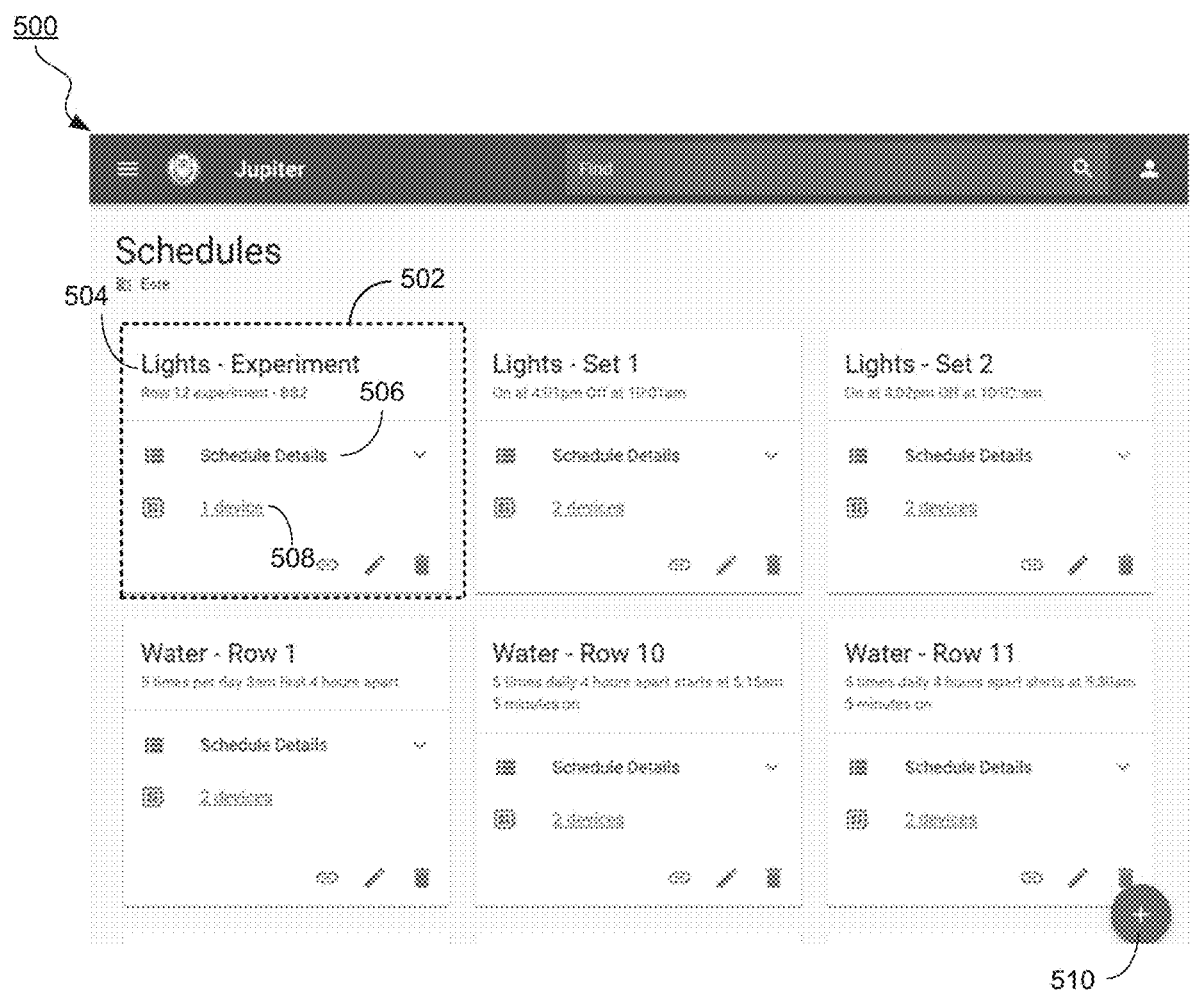
FIGS. 5A-5D illustrate an exemplary user interface for schedules in a facility management system, in accordance with some embodiments of the invention.

FIG. 5A illustrates an exemplary interface 500 for schedules in a facility management system, in accordance with some embodiments of the invention. An authorized user can access exemplary interface 500 at a local computer or via remote device such as remote computer 132 of FIG. 1A. In the illustrated embodiments, the user interface 500 allows an authorized user to setup a schedule for at least one device which can be controlled by an associated power relay. In the illustrated embodiment, the user interface 500 comprises 6 panels 502 each comprises a name 504 of a schedule, schedule details 506, and a number of devices 508 which are assigned with the schedule. For example, 2 devices can be assigned to a first schedule, e.g., "Lights—Set 1" and 1 device can be assigned to a second schedule, e.g., "Lights-Experiment." In some embodiments, a schedule can be linked to at least one device, can be modified by editing the schedule details and can be also deleted. In some embodiments, the user interface 500 further comprises a button 510 for adding new schedules. Accordingly, interface 500 can be used to create schedules to control any of the sub-systems of an indoor farm, including, but not limited to, the air circulation system, the lighting system, the irrigation system, the liquid circulation system, vision system and the tray handling system.

Figure 5B:
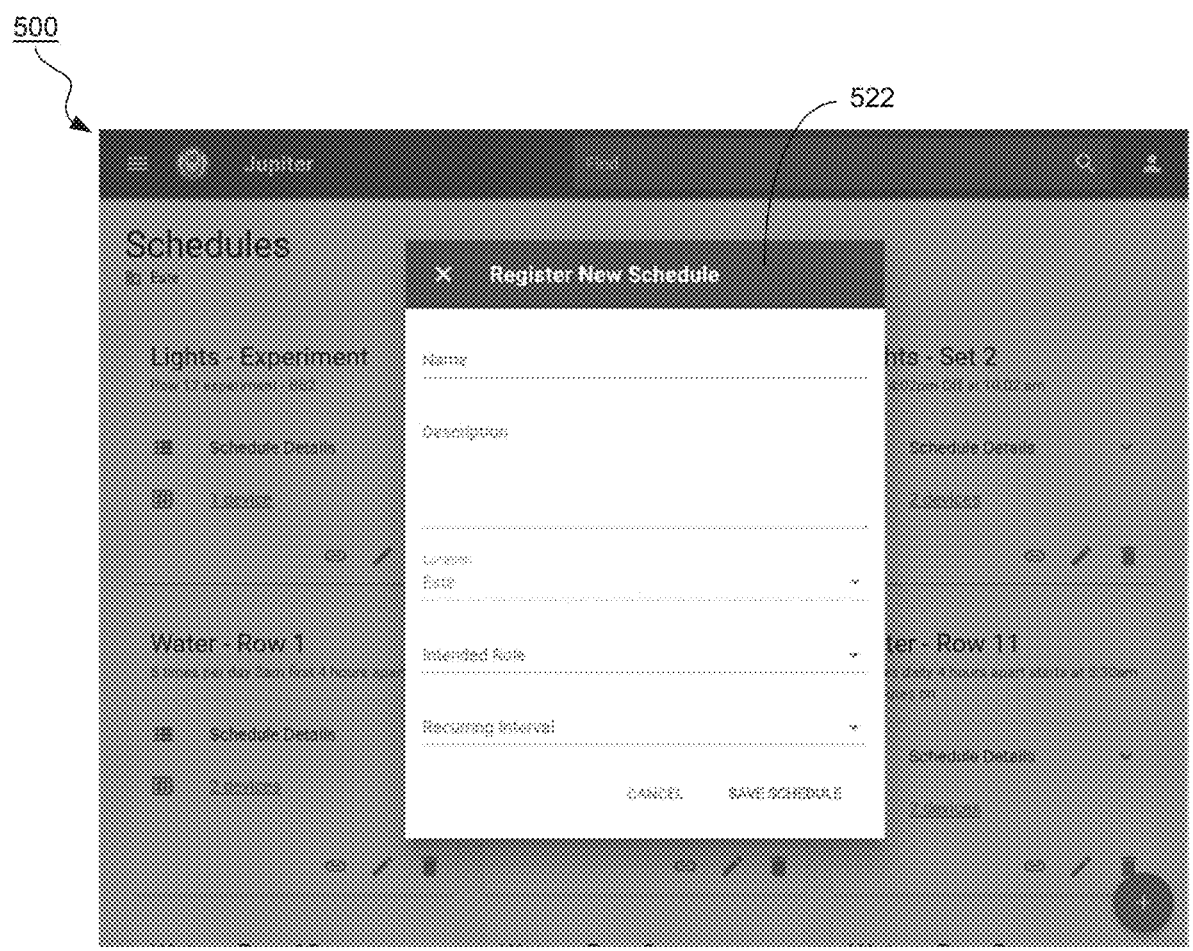

FIG. 5B illustrates the new schedule registration feature of exemplary user interface 500 in a facility management system, in accordance with some embodiments of the invention. In the illustrated embodiment, the user interface 500 comprises a pop-up window 522 which allows an authorized user to set up a new schedule event, such as a new schedule for lights to turn on. In this example, the user can edit a name and description of a schedule, select a facility location, a role of a device, and a recurring interval. In some embodiments, the recurring interval comprises a week, a day and an hour. In some other embodiments, the recurring interval can be customized. In some embodiments, this allows each facility to craft schedules that work best for their physical setups and in accordance with plant recipes.

Figure 5C:
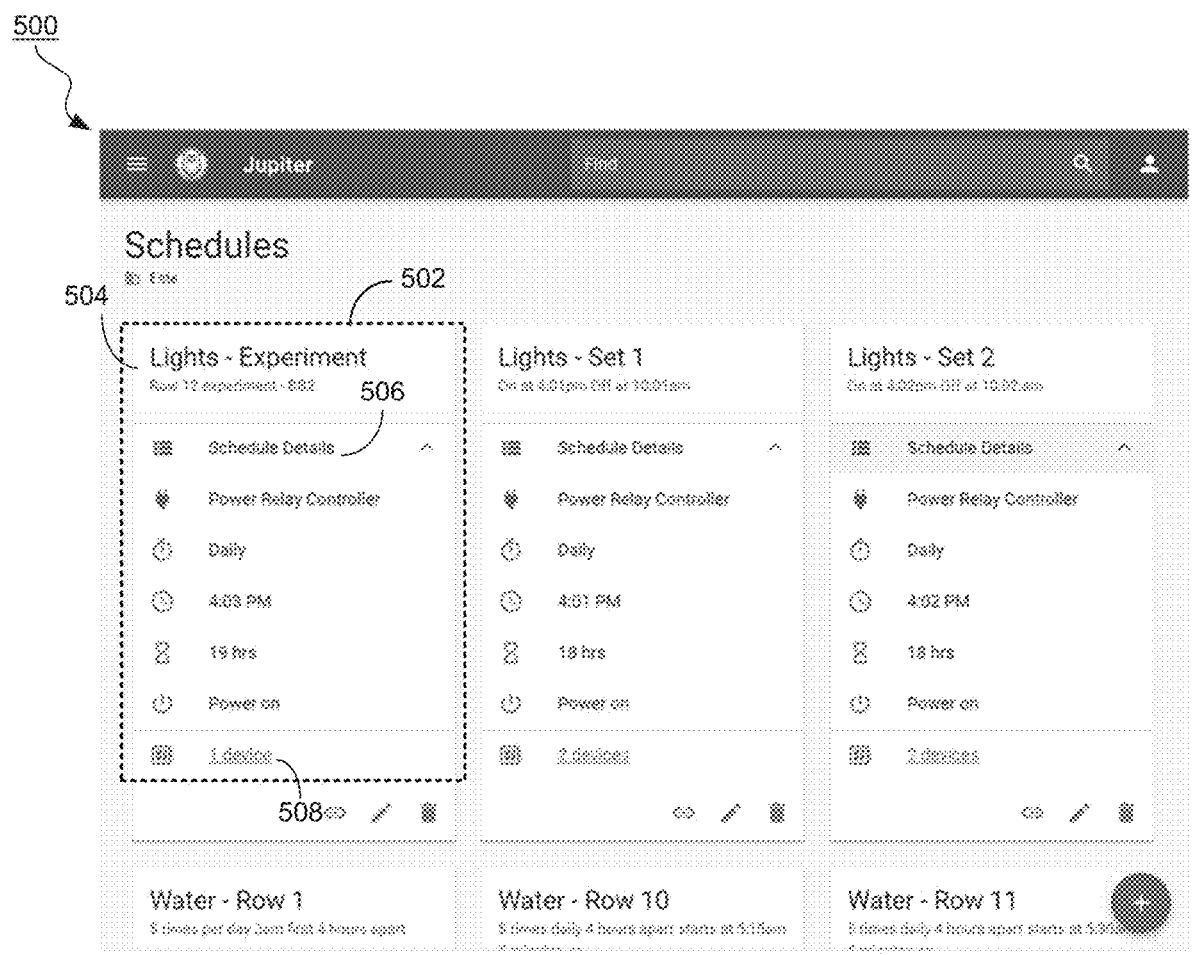

FIG. 5C illustrates an example of a schedule detail of user interface 500 of schedules in a facility management system, in accordance with some embodiments of the invention. FIG. 5C shows the six panels 502 of FIG. 5A with expanded schedule details 506. For example, a first schedule (i.e., Lights-Experiment), a second schedule (i.e., Lights—set 1), and a third schedule (i.e., "Lights—set 2") are all set to turn on at around 4 pm in the afternoon every day, and set to turn off at around 10 am in the morning every day. In some embodiments, the second schedule and the third schedule are linked to 2 relay devices.

Figure 5D:
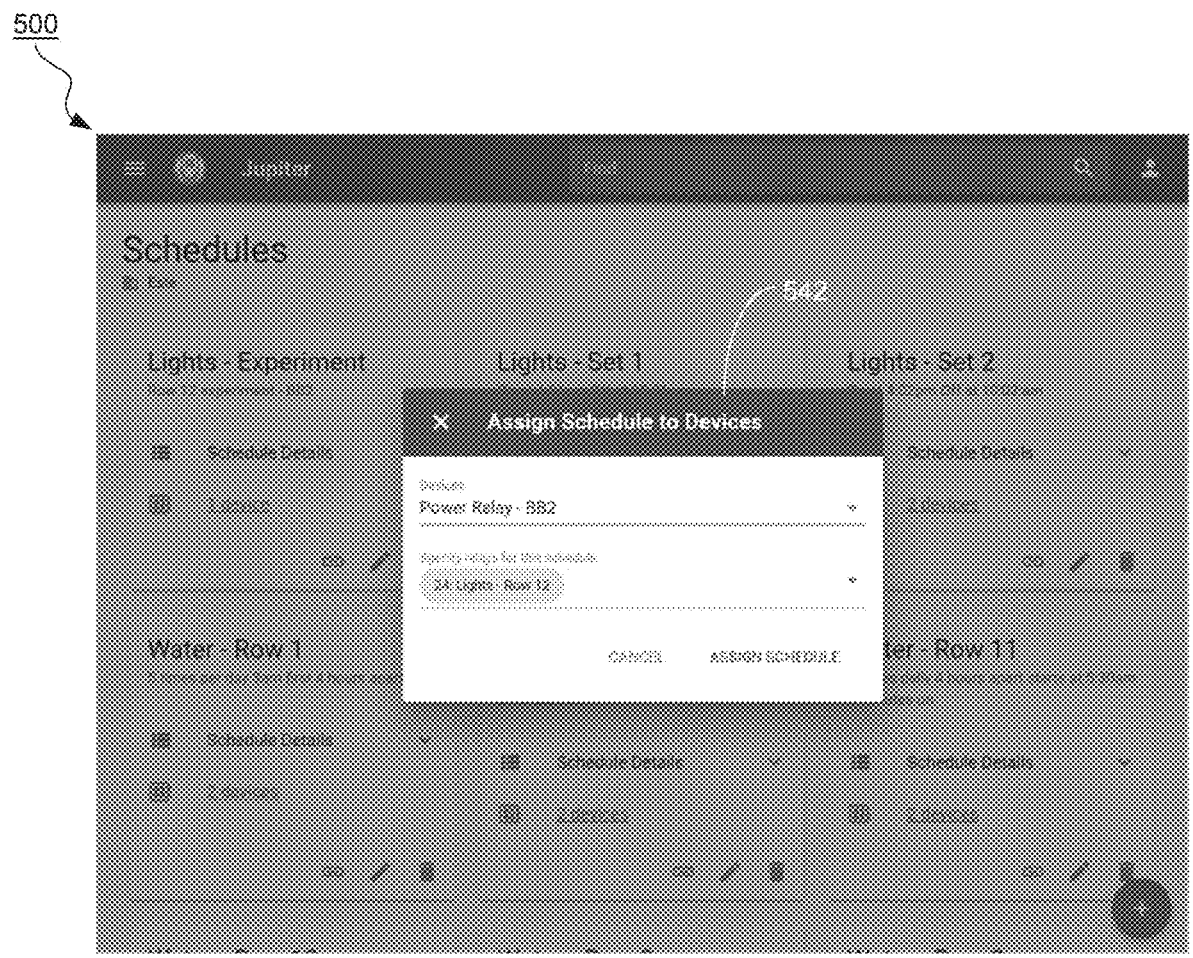

FIG. 5D illustrates how devices are assigned to a schedule in exemplary user interface 500 of schedules in a facility management system, in accordance with some embodiments of the invention. In some embodiments, the user interface 500 comprises a pop-up window 542, which allows an authorized user to set up a schedule for a relay device in a facility.

Figure 6:
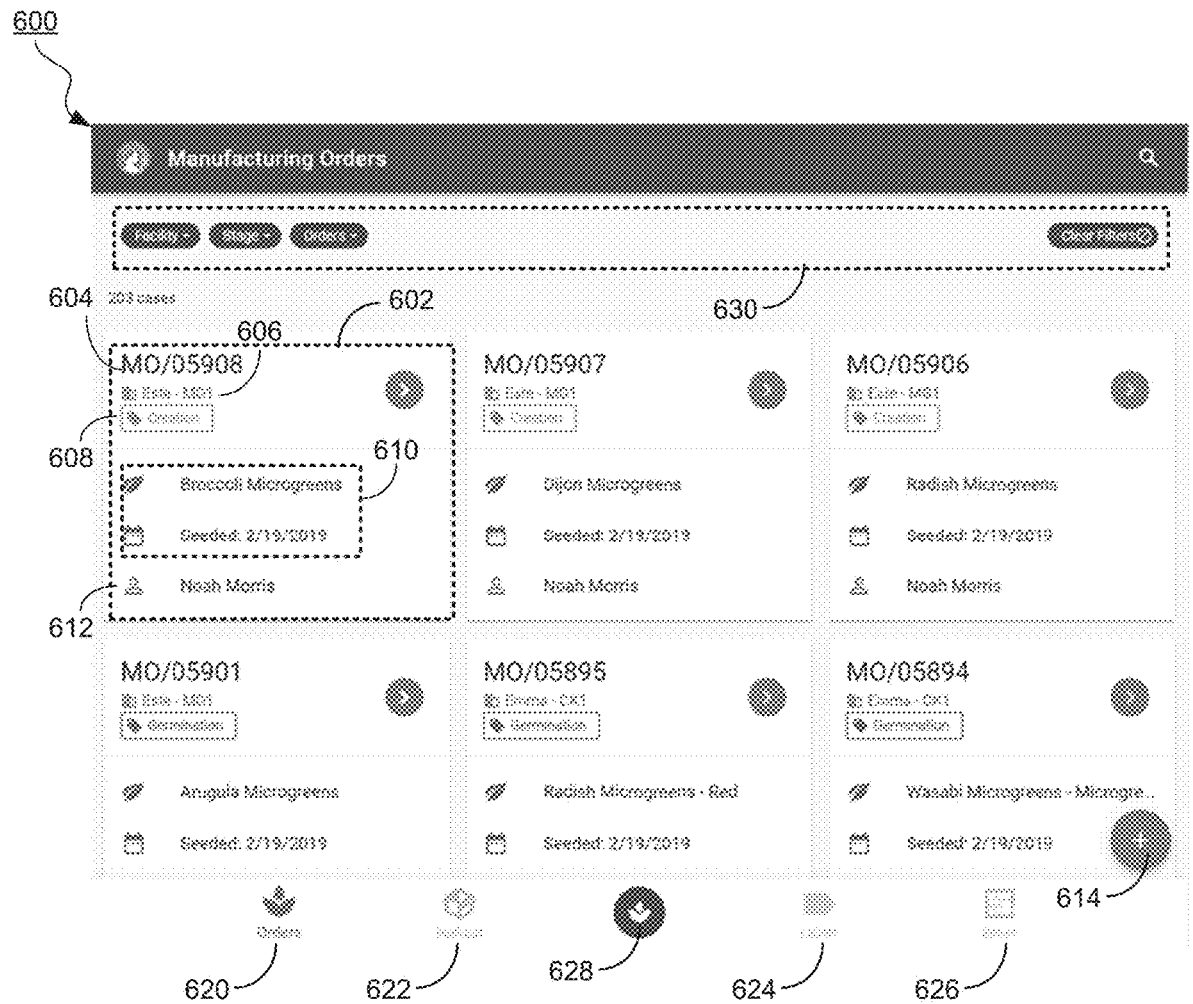
FIG. 6 illustrates an exemplary user interface of a homepage of an order management system, in accordance with some embodiments of the invention.

FIG. 6 illustrates an exemplary user interface 600 of a homepage of an order management system, in accordance with some embodiments of the invention. In the illustrated embodiments, the user interface 600 comprises 6 panels 602 for 6 manufacturing orders. In the illustrated embodiments, manufacturing orders (MO) are used to track the production of plants at indoor farming facilities. MOs can also be used to instruct growers about when and were to plant certain crops, as well as the current status of a plant's growth. MOs can also be used to track the materials or ingredients used in growing plants at the farming facilities. In the illustrated embodiment, each of the 6 manufacturing orders comprises a manufacturing order (MO) number 604, a facility 606, a MO stage 608, a MO details 610, and an authorized grower 612. In some embodiments, the user interface 600 further comprises a button 614 for creating a new MO. In some embodiments, the user interface 600 further comprises a first link 620, a second link 622, a third link 624, a fourth link 626, and a fifth link 628. In some embodiments, the first link 620 allows the authorized user to directly access all the MOs in all the facilities that can be accessed by the authorized user. In some embodiments, the second link 622 allows the authorized user to access packout information. In some embodiments, the third link 624 allows the authorized user to access and print a plurality of labels. In some embodiments, the fourth link 626 allows an organization of MOs according growth zones. In some embodiments, the fifth link 628 allows the authorized user to navigate back to the homepage. In some embodiments, the user interface 600 further comprises a filter 630 which allows the authorized user to access MOs according to one of the following: facility, stage and orders. The MOs can be filtered or searched by plant type, germination status, MO number or any data related to a manufacturing order.

Figure 7A:
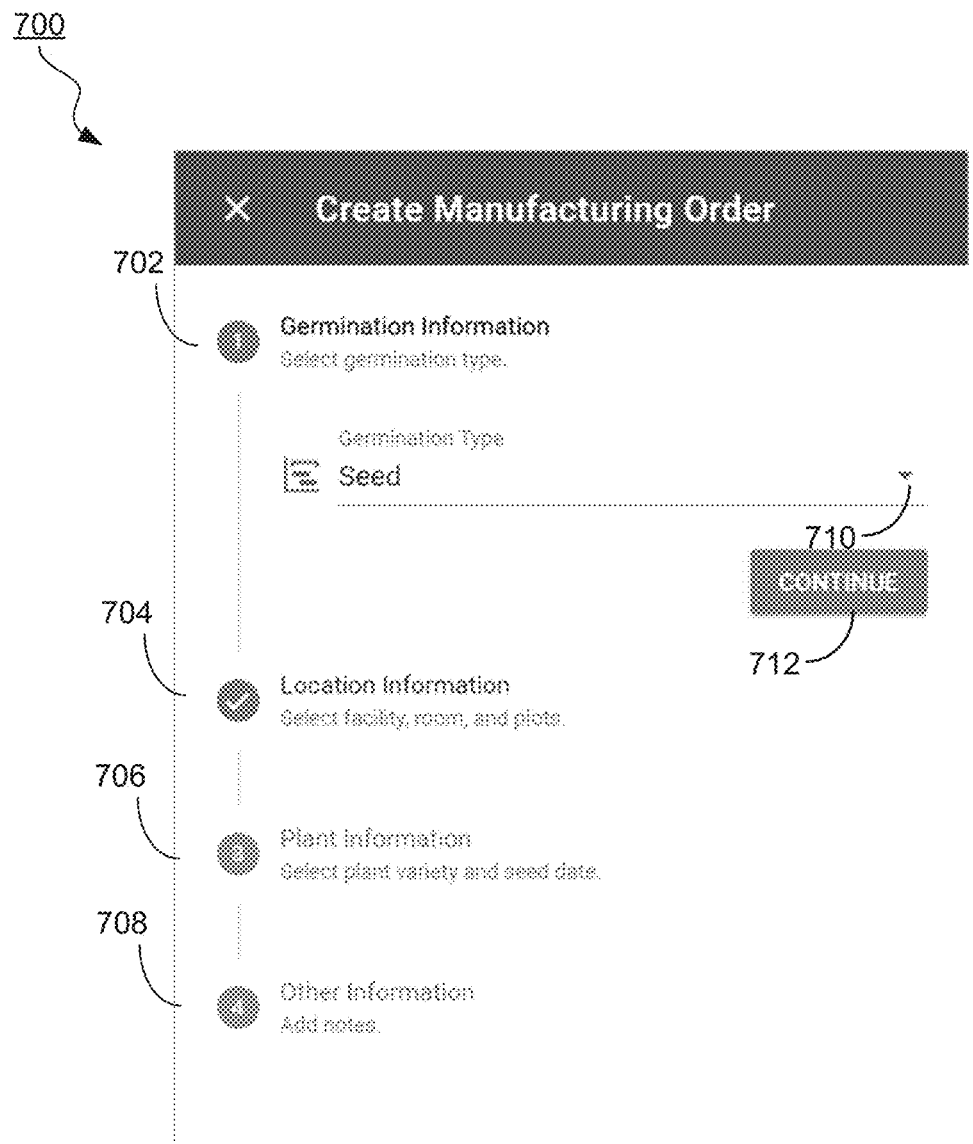
FIGS. 7A-7E illustrate an exemplary user interface for creating a manufacturing order (MO) using an order management system, in accordance with some embodiments of the invention.

FIG. 7A illustrates an exemplary user interface 700 for creating a manufacturing order (MO) using an order management system, in accordance with some embodiments of the invention. In some embodiments, the user interface 700 enables collection of at least one of the following: germination information 702, location information 704, plant information 706 and other information 708. In some embodiments, the user interface 700 is configured for entering the germination information of the MO. In some embodiments, a germination type can be selected from a drop-down list 710, wherein the drop-down list 710 of the germination type comprises at least one of the following: seed, plug/seedling, cutting, grafting, and division. In some embodiments, when germination type is selected, a button 712 can be used to navigate to a following step.

Figure 7B:
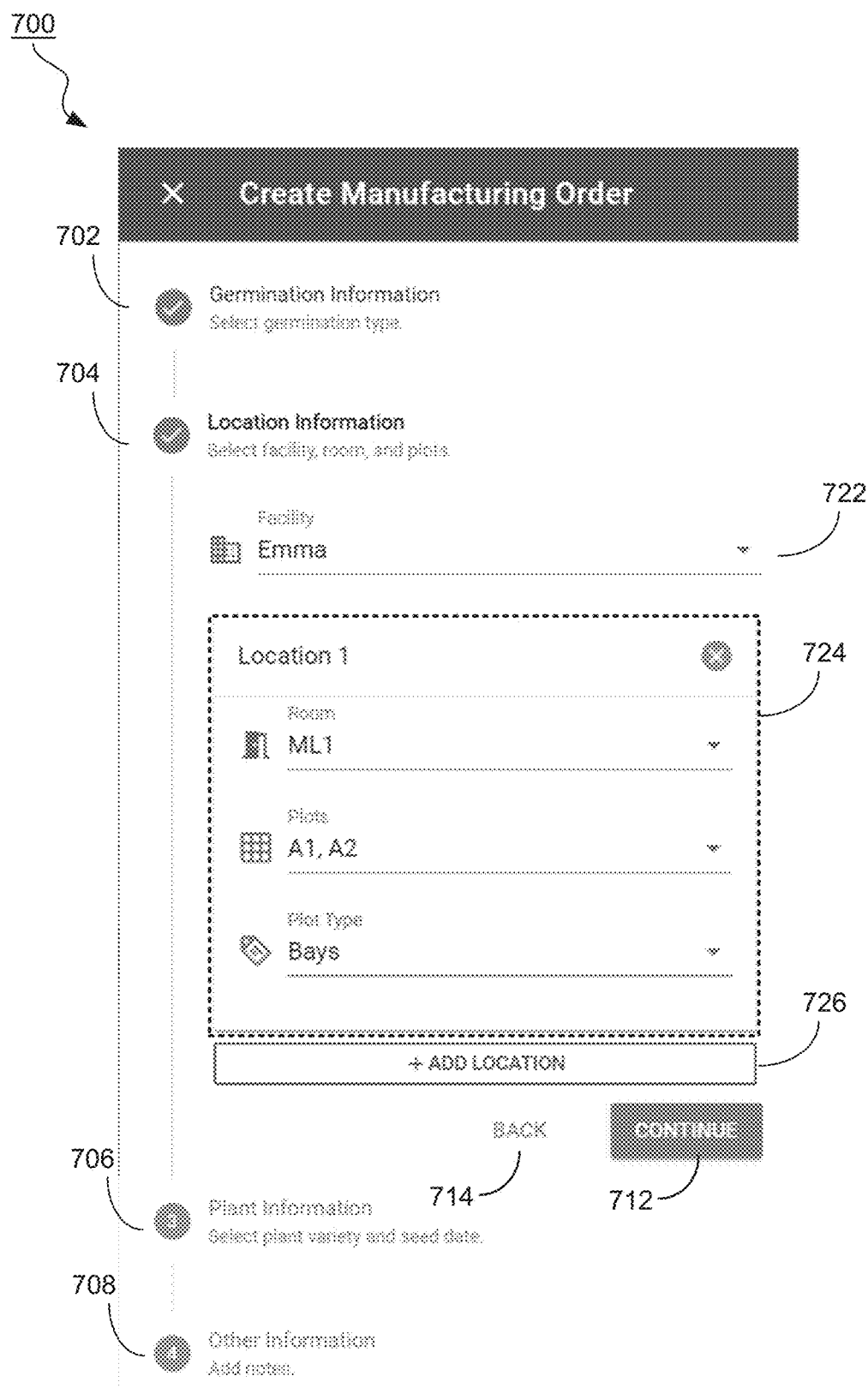

FIG. 7B illustrates the location information feature of exemplary user interface 700 for creating a manufacturing order (MO) using an order management system, in accordance with some embodiments of the invention. In some embodiments, a facility 722 and location 724 can be selected from corresponding drop-down lists. In some embodiments, the corresponding drop-down lists each comprises names of facilities that can be accessed by the authorized user. In some embodiments, the location 724 further comprises detailed location information, including room, plots and plot type, where the plant is located and which can be selected from corresponding drop-down lists. In some embodiments, the location 724 indicates a physical location of a facility (i.e., plot) where plants in the MO are located during a growth cycle. In some embodiments, the user interface 700 further comprises a button 726 for adding a new location in the same facility as the existing location or a different facility that can be accessed by the authorized user for the new MO. In some embodiments, when germination type is selected, a button 712 can be used to navigate to a following step. In some embodiments, the user interface 700 further comprises a button 714, which allows the authorized user to navigate back to a previous step when creating the MO.

Figure 7C:
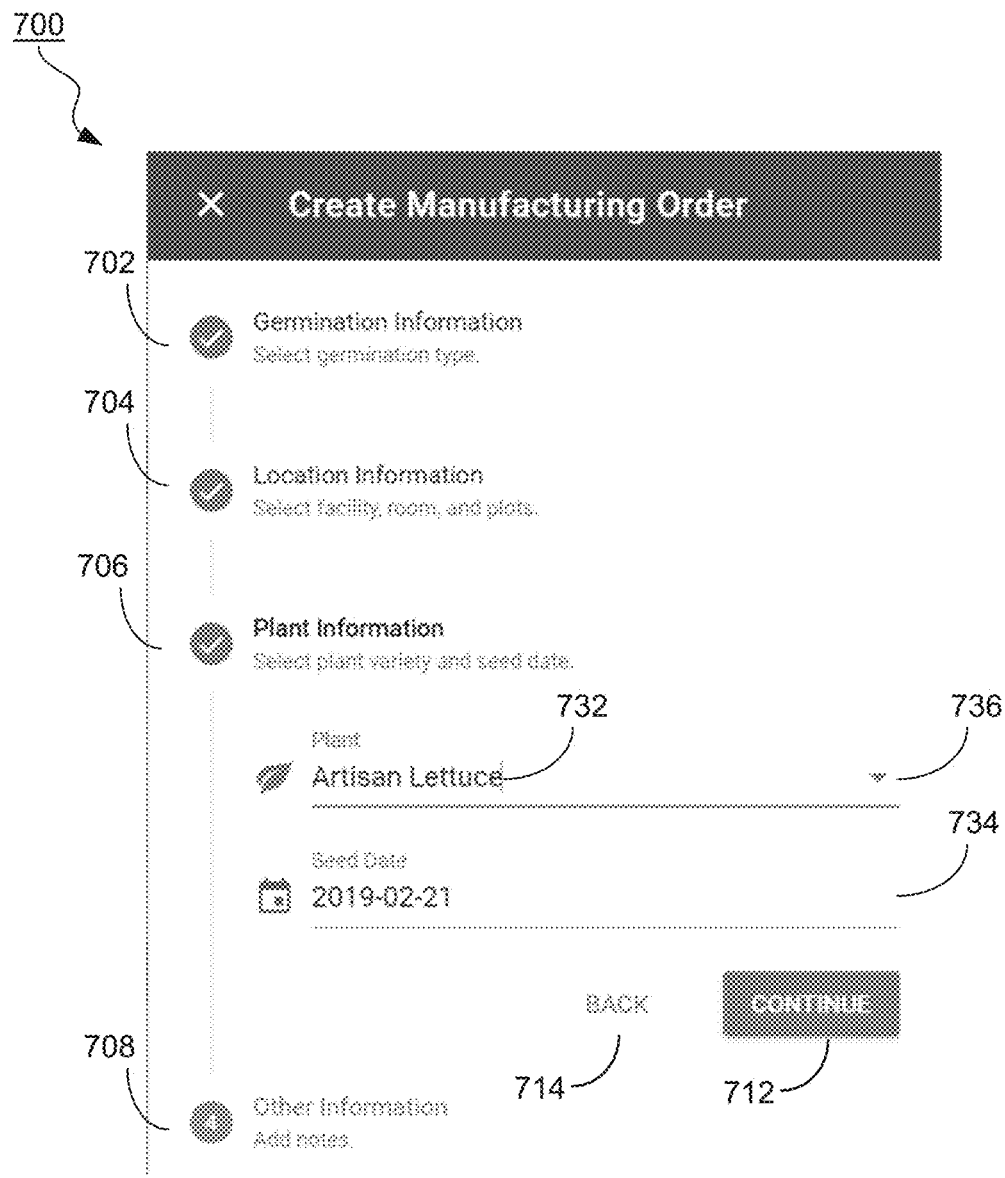

FIG. 7C illustrates the plant information feature of exemplary user interface 700 for creating a manufacturing order (MO) using an order management system, in accordance with some embodiments of the invention. In some embodiments, the plant information of the MO comprises a plant type 732 and a seed date 734. In some embodiments, the plant type 732 can be selected from a drop-down list 736, wherein the drop-down list 736 comprises a list of all plant types grown at the facility or plant types added by any authorized user of the system. In some embodiments, when the plant information is completed, a button 712 can be used to navigate to a following step.

Figure 7D:
Figure 7D:
Figure 7D:
Figure 7D:
Figure 7D:

FIG. 7D illustrates an exemplary user interface 740 for creating a manufacturing order (MO) using an order management system, in accordance with some embodiments of the invention. In some embodiments, the user interface 740 is configured for entering material information of the MO. In some embodiments, when a plant type is selected (e.g., in a user interface 700), the MO management system receives a recipe instruction from an inventory data base (i.e., Odoo), in which the recipe instruction comprises whether seeds 742 are required for completing the MO and at least one media carrier 744 that can be used for growing the plant.

Figure 7E:
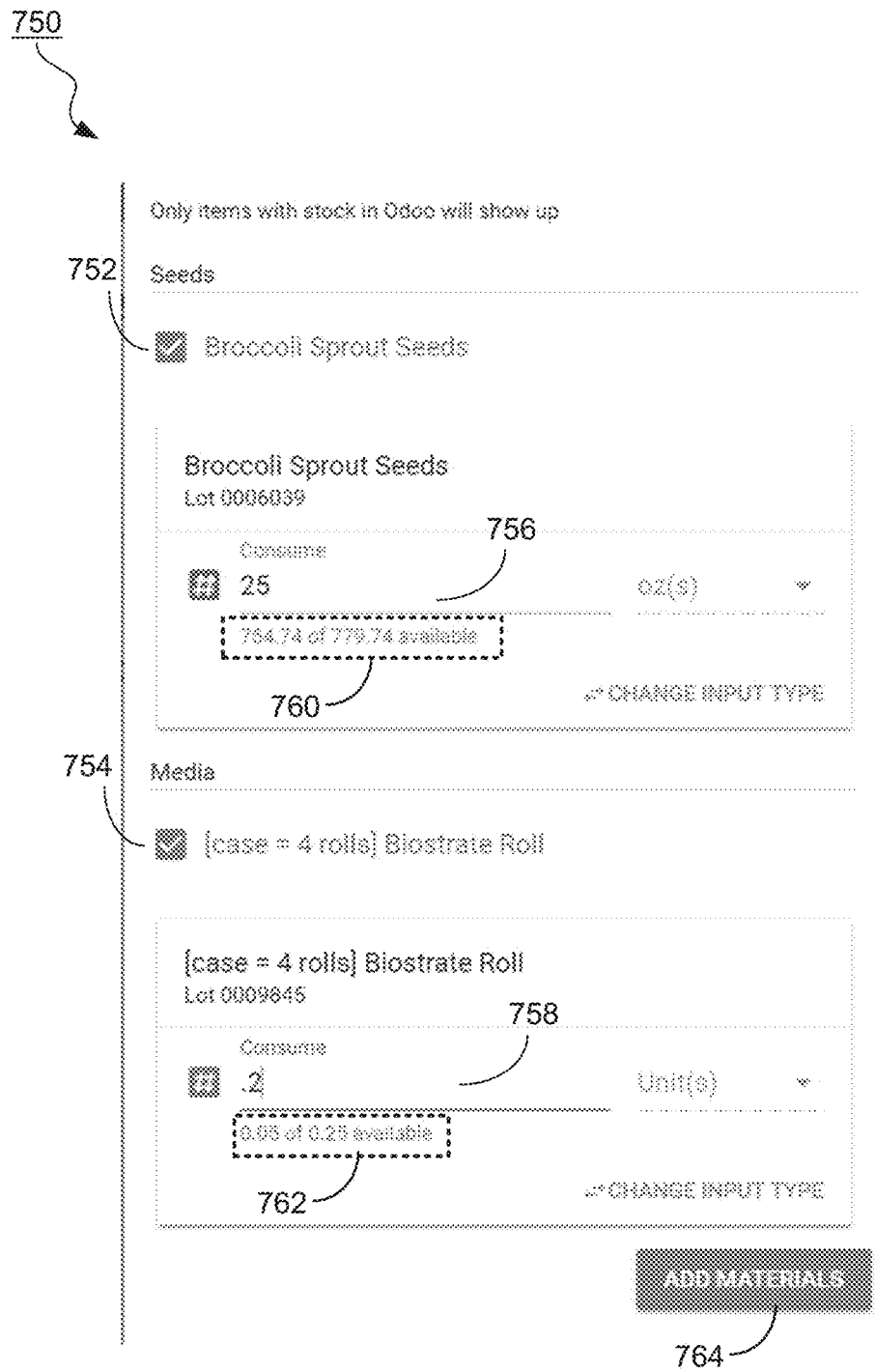

FIG. 7E illustrates an exemplary user interface 750 for creating a manufacturing order (MO) using a MO management system, in accordance with some embodiments of the invention. In some embodiments, the user interface 750 is configured for entering detailed material information of the MO. For example, when seeds is selected by checking a first box 752, a total weight of seeds 756 that is needed for the MO can be entered; and when the media material is selected by checking a second box 754, a number 758 of biostrate rolls can be entered. In some embodiments, a total weight 760 of seeds of the plant and the total number 762 of media carrier are also indicated in the user interface 750. In some embodiments, when the information is complete in the user interface 750, a button 764 is enabled so as to allow an authorized user to add materials to the MO. In some embodiments, the user interface 750 further comprises information of the seeds and media carriers (e.g., lot numbers) to allow a tracking of the MO.

Figure 8:
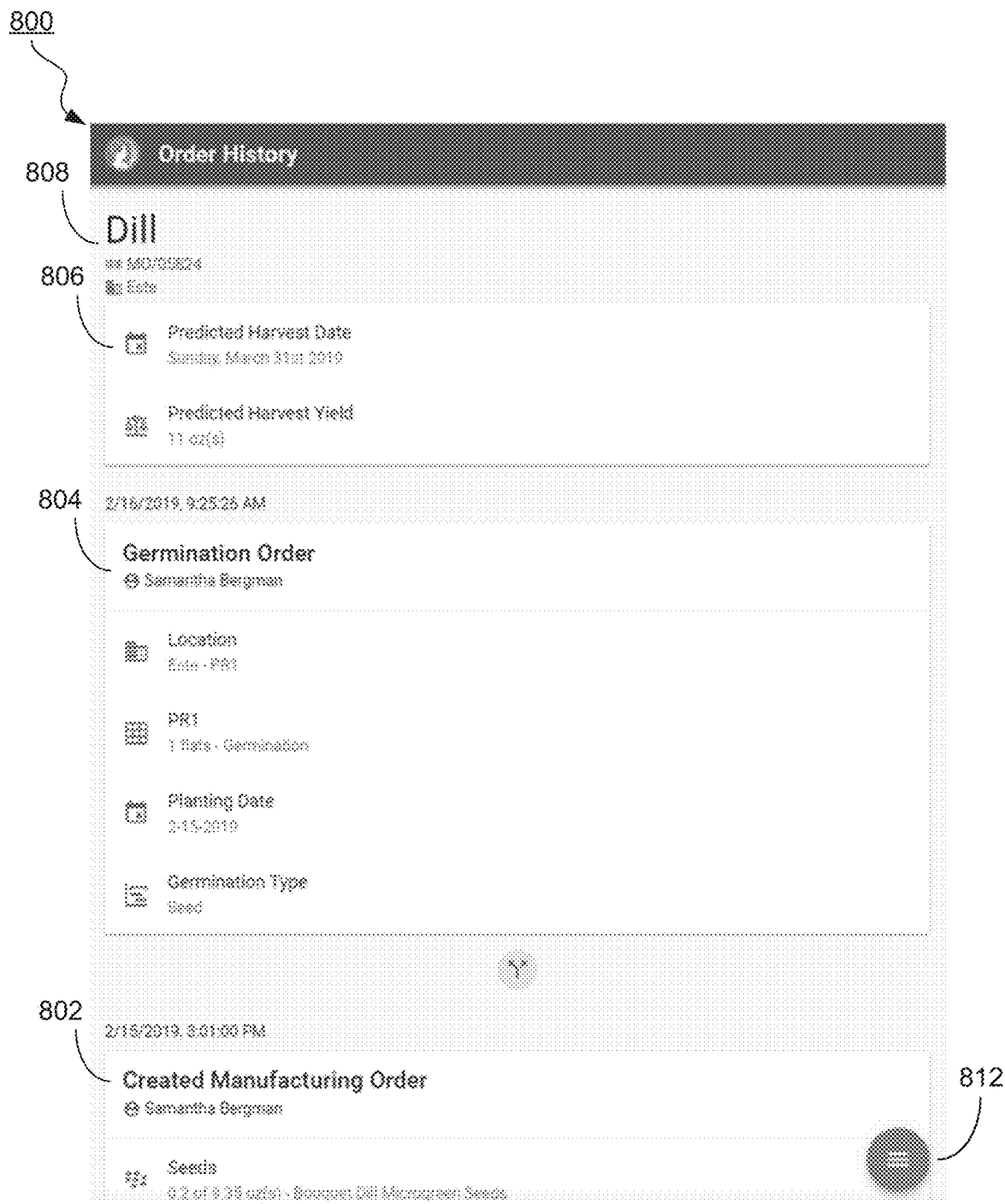
FIG. 8 illustrates an exemplary user interface of a manufacturing order (MO) status page of an order management system, in accordance with some embodiments of the invention.

FIG. 8 illustrates an exemplary user interface 800 of a manufacturing order (MO) status page of an order management system, in accordance with some embodiments of the invention. In some embodiments, the user interface 800 of a MO status page comprise a history of the MO including information of a MO creation 802, information of a germination process of the MO 804, and information of a predicted harvest 806. In some embodiments, the information of the MO creation comprises at least one of the following: a date when the MO is created, an authorized user who created the MO, information regarding the seeds used, and information regarding the media carriers used. In some embodiments, the information of the germination process comprises at least one of the following: location, a planting date and a germination type. In some embodiments, the information of the predicted harvest comprises at least one of the following: a predicted harvest date and a predicted harvest yield according to previous statistical data of the plant and the facility. In some embodiments, the user interface 800 also allows the authorized user to change a status of the MO (e.g., germination, production, harvest, and completion). In some embodiments, the user interface 800 allows the authorized user to track a current location and history location of the MO. In some embodiments, the user interface 800 also comprises general information 808 of the MO including, a MO name, a MO number, and a current facility of the MO. In some embodiments, the user interface 800, comprises an actions button 812 that allows a user to have quick access to certain actions with respect to the MO subject crop. These actions can include one of the following:

create harvest order, relocate crop, move to production, and write off. The create harvest order action is shown in FIG.9A below.

Figure 9A:
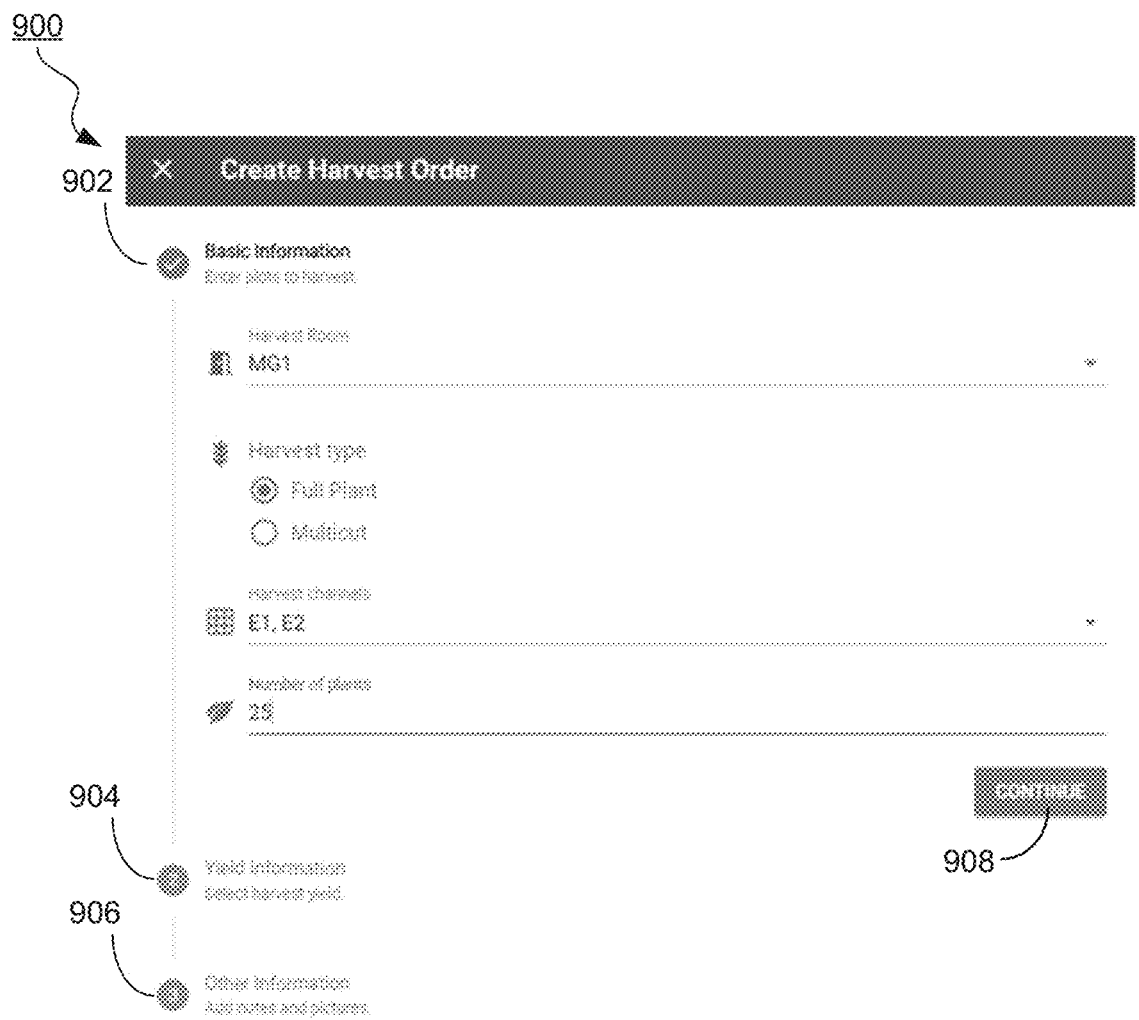
FIGS. 9A-9B illustrate an exemplary user interface for creating a Harvest order (HO) using an order management system, in accordance with some embodiments of the invention.

FIG.9A illustrates an exemplary user interface 900 for creating a Harvest Order (HO) using an order management system, in accordance with some embodiments of the invention. An authorized user can access exemplary user interface 900 at a local computer or via remote device such as remote computer 132 of FIG.1. In some embodiments, the HO is used to track harvest related information, such as the type of crop harvested, the amount and the location of the harvest. In some embodiments, the user interface 900 comprises at least one of the following: basic information 902, yield information 904, and other information 906. In some embodiments, the user interface 900 is configured for entering the basic information of the HO. In some embodiments, the basic information 902 comprises a Harvest room name, a harvest type, harvest channels and a number of plants.

In some embodiments, the harvest type can be a full plant or a multi-cut. A full-plant harvest type refers to harvesting the entire plant and removing all plant media material from the corresponding plot or tray either as viable product or as waste. A multi-cut harvest type indicates that a viable product is being harvested from a plot or tray, but the plot is not being vacated. This is done when what is left of the plant after harvest is allowed to remain and regrow to be further harvested in the future. Basil is an example of a plant that is typically full plant harvested, while tomatoes are an example of a plant that is typically multi-cut. In some embodiments, the harvest channels field is used to record the location of the harvested plant, for example the specific plot or tray that was harvested. In some embodiments, when the plant information is completed, a button 908 can be used to navigate to entering the yield information 904.

Figure 9B:
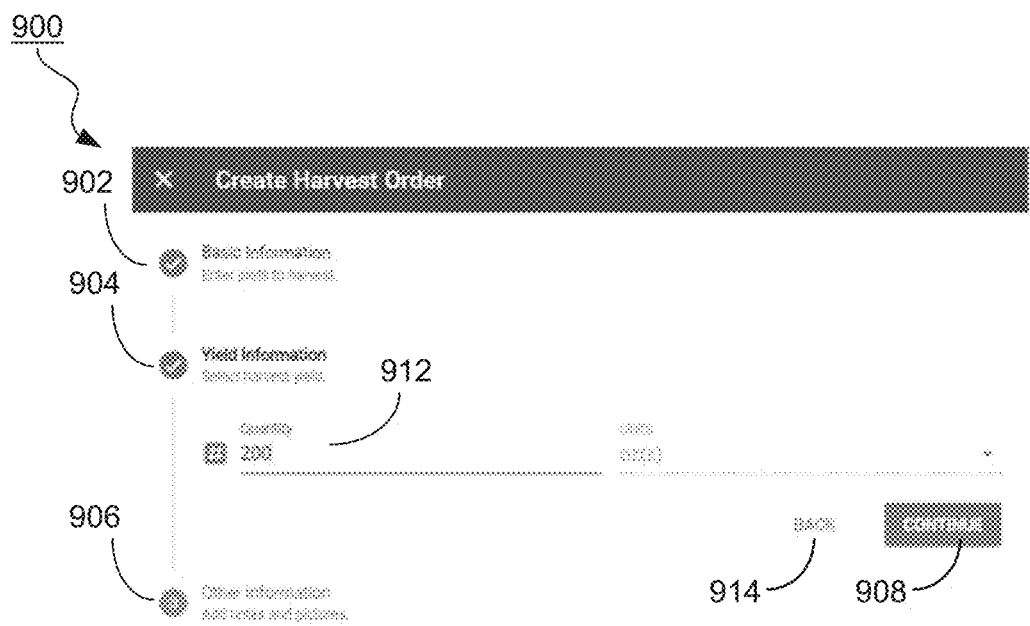

FIG.9B illustrates the yield feature of exemplary user interface 900 for creating a Harvest Order (HO) using an order management system, in accordance with some embodiments of the invention. In some embodiments, the yield information 904 comprises a yield quantity 912. In some embodiments, when the yield information 904 is completed, a button 908 can be used to navigate to entering the other information of the HO. In some embodiments, the user interface 900 further comprises a button 914, which allows the authorized user to navigate back to entering/modifying the basic information. In some embodiments, the yield information 904 is transmitted to an inventory data base (i.e., Odoo) for a packout order and a corresponding lot number for the HO is the created.

Figure 10:
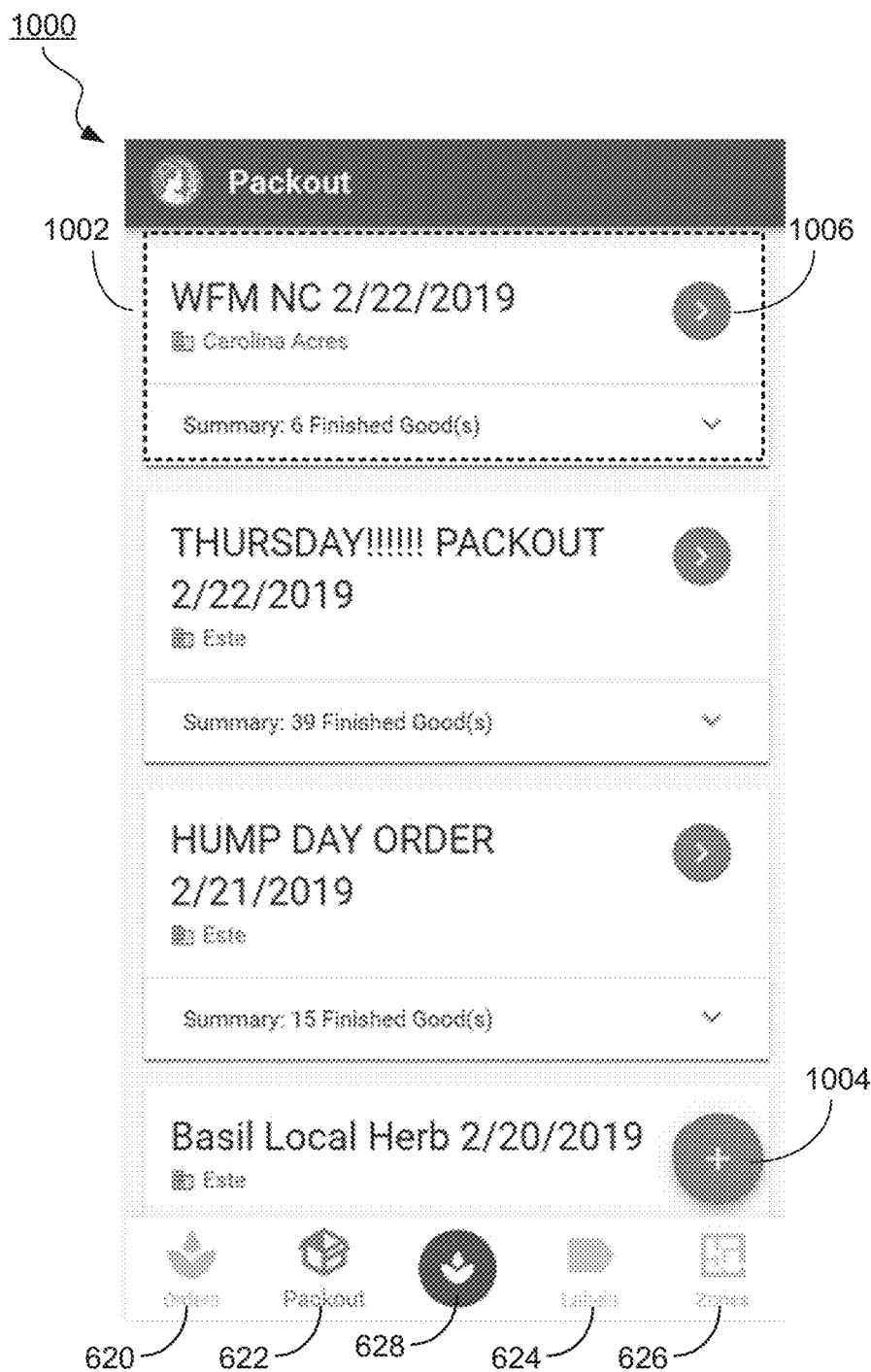
FIG. 10 illustrates an exemplary user interface of a homepage for packout orders (PO) in an order management system, in accordance with some embodiments of the invention.

FIG.10 illustrates an exemplary user interface 1000 of a homepage for packout orders (PO) in an order management system, in accordance with some embodiments of the invention. An authorized user can access exemplary user interface 1000 at a local computer or via remote device such as remote computer 132 of FIG.1A. In some embodiments, POs can be used to provide instructions for creating a final product at an indoor farming facility. In some embodiments, POs can also be used to track the status of creation of a final product and the inventory of materials used in the creation of the final product.

In some embodiments, the user interface 1000 comprises 4 panels 1002 for 4 POs. In some embodiments, each of the 4 panels 1002 comprises information of each of the 4 corresponding POs, including facility information, a date of the PO and a summary of the PO. In some embodiments, details of a PO can be accessed by an authorized user by clicking a button 1006. In some embodiments, the user interface 1000 further comprises a first link 620, a second link 622, a third link 624, a fourth link 626, and a fifth link 628. In some embodiments, the first link 620 allows the authorized user to directly access all the MOs in all the facilities that can be accessed by the authorized user. In some embodiments, the second link 622 allows the authorized user to access packout information. In some embodiments, the third link 624 allows the authorized user to access and print a plurality of labels. In some embodiments, the fourth link 626 allows an organization of MOs according to grow zones. In some embodiments, the fifth link 628 allows the authorized user to navigate back to the homepage. In some embodiments, the user interface 1000 of the homepage for POs can be accessed by an authorized user by clicking the second link 622. In some embodiments, the user interface 1000 further comprises a button 1004 for adding a new PO.

Figure 11A:
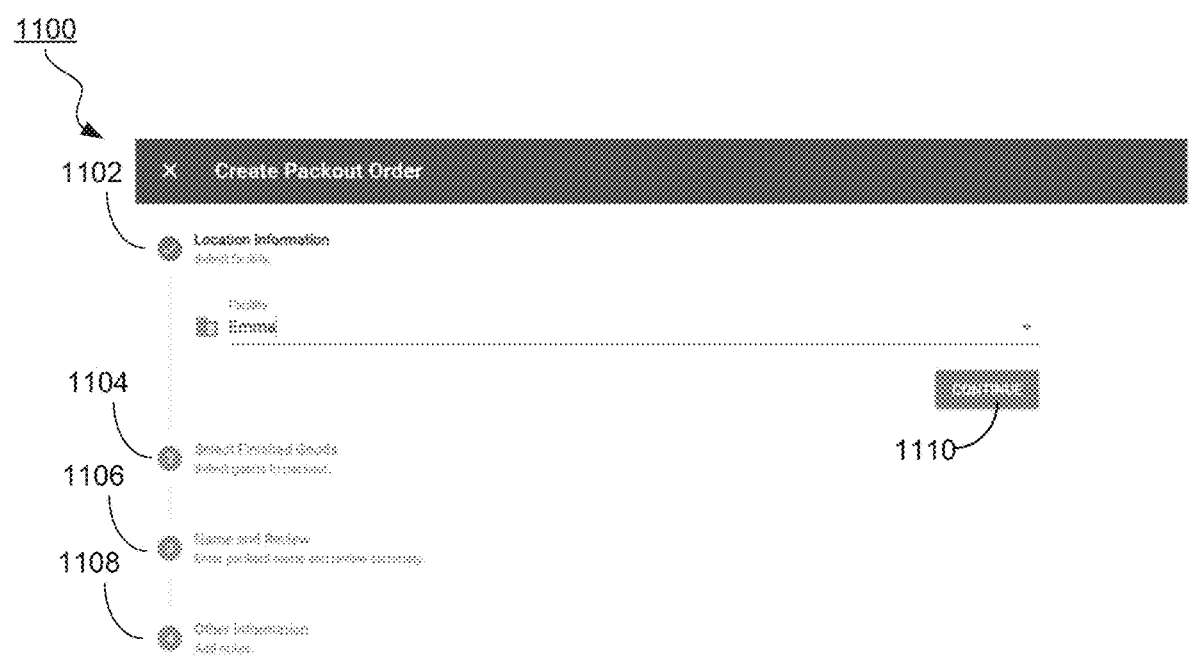
FIGS. 11A-11C illustrate an exemplary user interface for creating a packout order (PO) using an order management system, in accordance with some embodiments of the invention.

FIG.11A illustrates an exemplary user interface 1100 for creating a packout order (PO) using an order management system, in accordance with some embodiments of the invention. An authorized user can access user interface 1100 at a local computer or via remote device such as remote computer 132 of FIG.1A. In some embodiments, the user interface 1100 comprises at least one of the following: location information 1102, select finished goods 1104, name/review 1106 and other information 1108. In some embodiments, the user interface 1100 is configured for entering the location information of the PO. In some embodiments, the location information 1102 is a facility and can be selected from a drop-down list of facilities that can be accessed by the authorized user. In some embodiments, when the location information 1102 is completed, a button 1110 in the user interface 1100 can be used to navigate to entering the select finished goods of the PO.

Figure 11B:
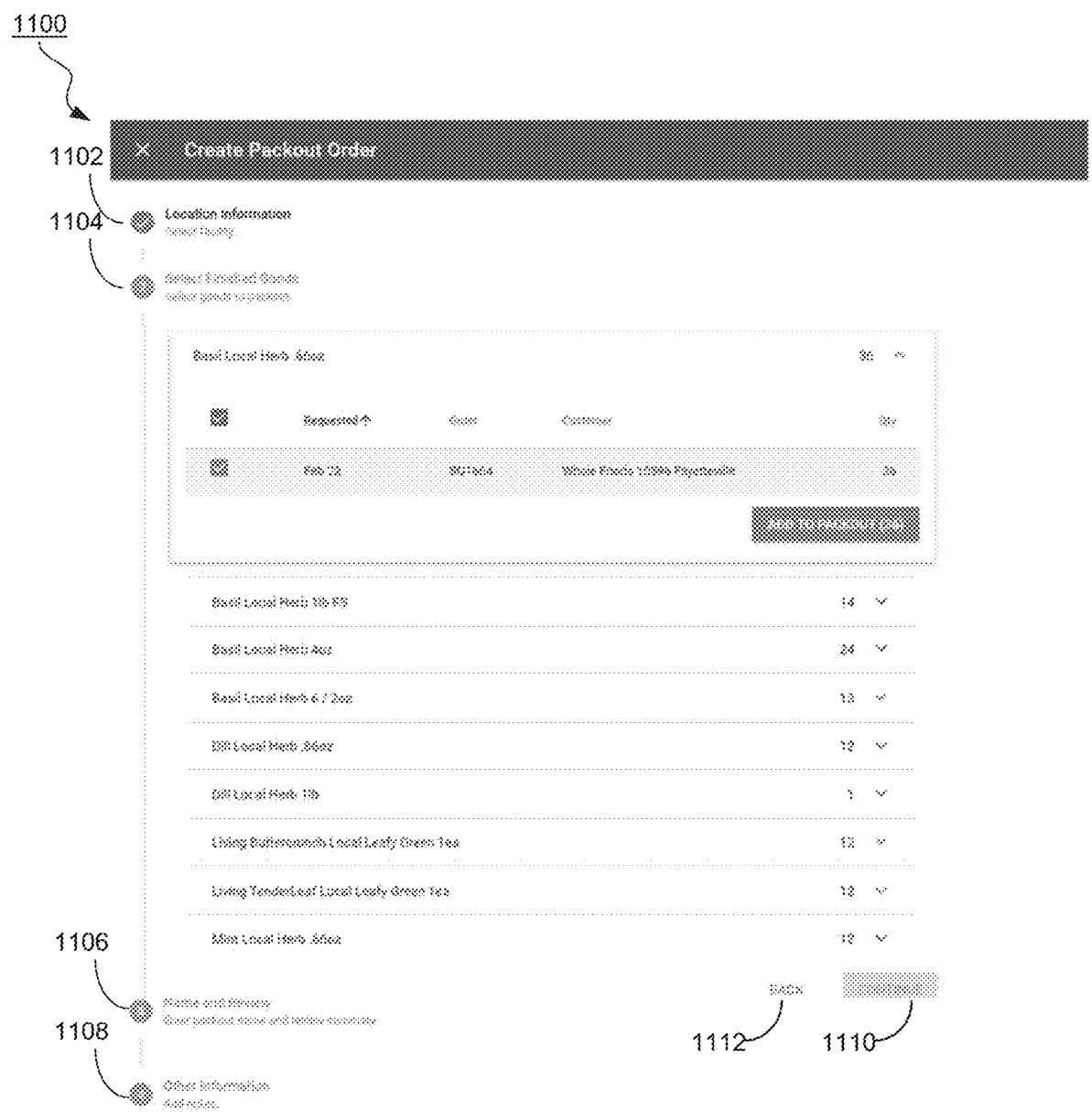

FIG.11B illustrates the select finished goods feature of the exemplary user interface 1100 for creating a packout order (PO) using an order management system, in accordance with some embodiments of the invention. In some embodiments, the Select Finished Goods 1104 comprises at least one of the following: a name of a customer of the PO, a date when the PO is created, a type of plants and a quantity of the plants. In some embodiments, the information for Selecting Finished Goods 1104 is determined by the inventory data base (i.e., Odoo) according to a predetermined threshold. In some embodiments, the predetermined threshold is a number of days towards a plant's readiness to be harvested. In some embodiments, information about a number of days towards a completion equal to or less than the predetermined threshold is included in the Select Finished Goods 1104 of the user interface 1100. In some embodiments, at least one plant can be selected from the list of plants and added to the PO by the authorized user. In some embodiments, when the Select Finished Goods 1104 is completed, a button 1110 in the user interface 1100 can be used to navigate to the name/review 1106. In some embodiments, the user interface 1100 further comprises a button 1112 for navigating back to entering or modifying the location information 1102.

Figure 11C:
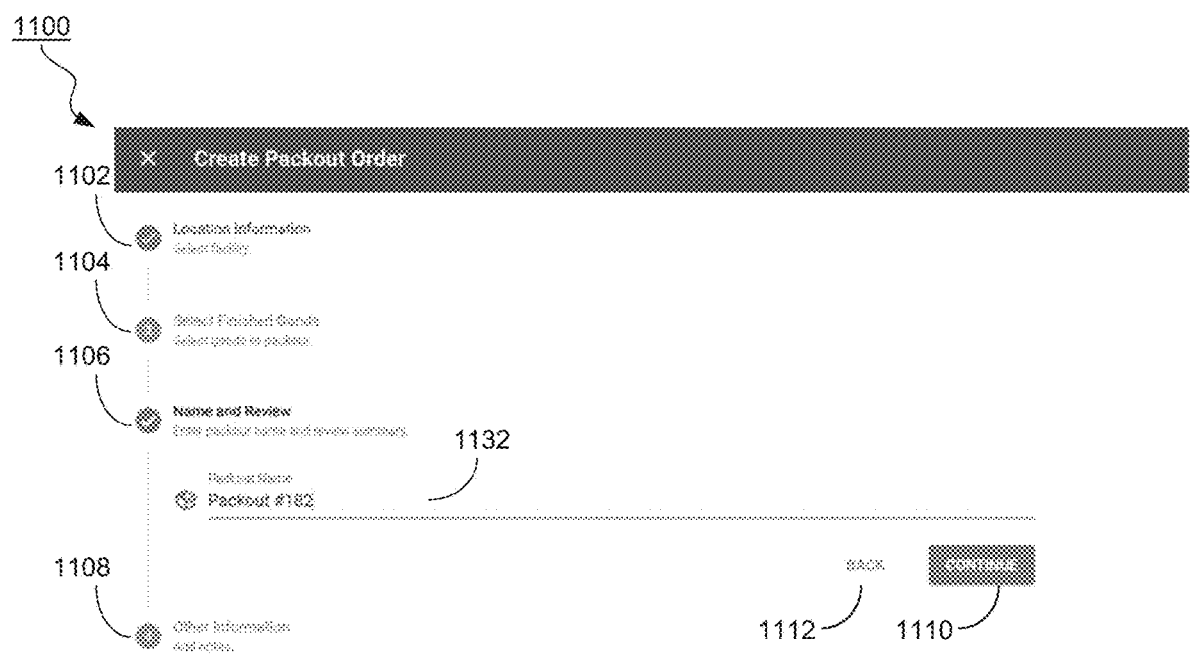

FIG.11C illustrates the name and review feature of the exemplary user interface 1100 for creating a packout order (PO) using an order management system, in accordance with some embodiments of the invention In some embodiments, the name/review 1106 comprises a name of the PO 1132. In some embodiments, when the name/review 1106 is completed, a button 1110 in the user interface 1100 can be used to navigate to the other information 1108. In some embodiments, the user interface 1100 further comprises a button 1112 for navigating back to entering or modifying the Select Finished Goods 1104.

Figure 12A:
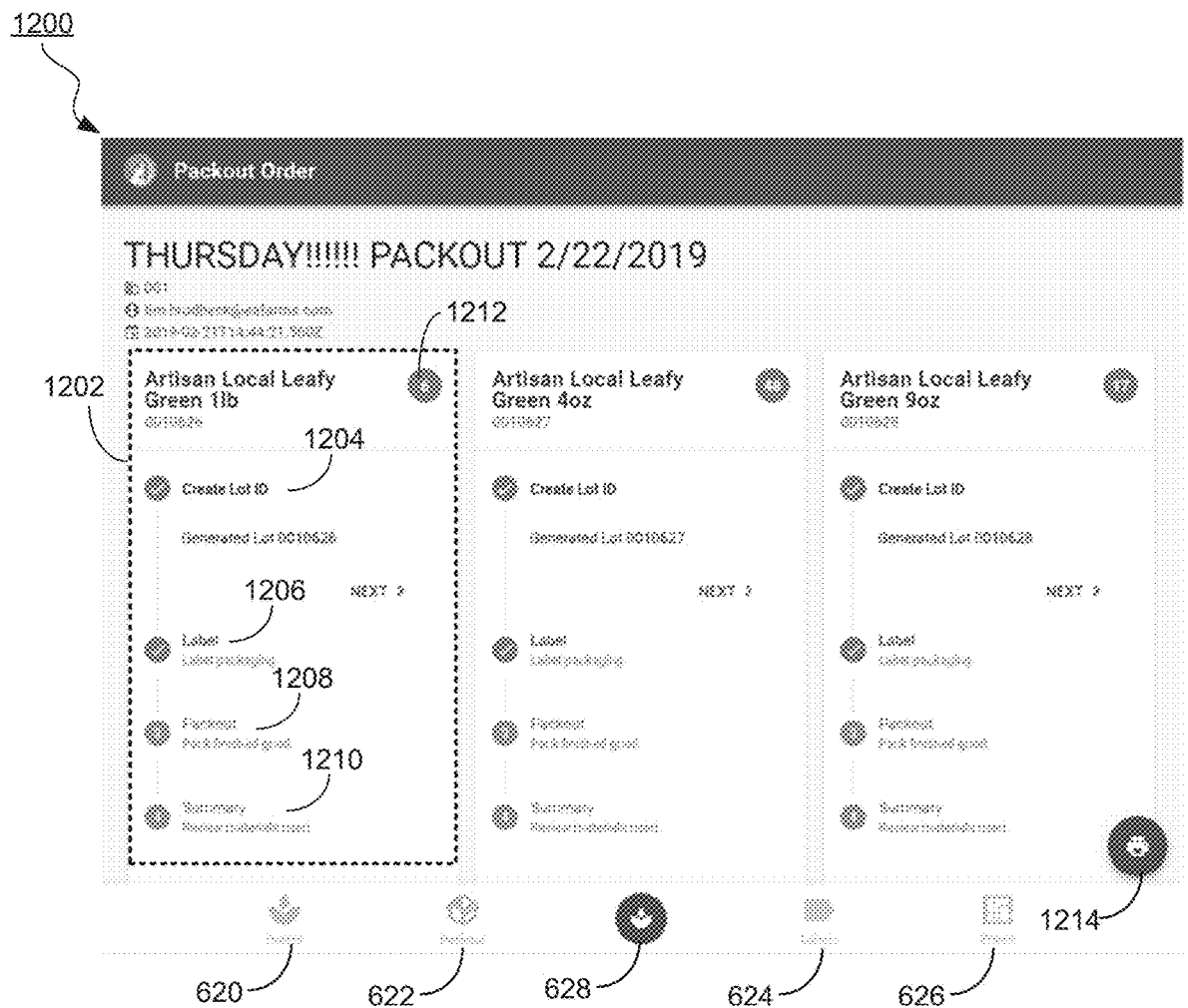
FIG. 12A illustrates an exemplary user interface for creating a product in a packout order (PO) in an order management system, in accordance with some embodiments of the invention.

FIG.12A illustrates an exemplary user interface 1200 for creating a product in a packout order (PO) in an order management system, in accordance with some embodiments of the invention. As described above, a PO is used to guide and track the creation of a final product at an indoor farming facility. In some embodiments, the final product comprises packaging and the harvest crop. The packaging may include printed labels or include separate packaging material and labels, such that the labels are placed onto the packaging material. The PO may include details about the packaging material, labeling, and crop used to create a finished product. In addition to guiding the creation of the finished product, the PO can be used to manage inventory of the materials and crops used to complete the finished product. An authorized user can access exemplary user interface 1200 at a local computer or via remote device such as remote computer 132 of FIG.1A.

In the illustrated embodiment, the user interface 1200 of a PO with a name of "THURSDAY!!!!!! PACKOUT 2/22/2019" comprises 3 panels 1202 for 3 products. For example, the three exemplary products shown in panels 1202 are a 1 pound package of "Artisan Local Leafy Greens," a 4 oz package of "Artisan Local Leafy Greens," and a 9 oz package of "Artisan Local Leafy Greens." In some embodiments, each of the 3 panels 1202 comprises at least one of the following fields to fulfill the production in the PO: create a Lot ID 1204, create a label 1206, packout 1208, summary 1210 and a quantity of the product 1212. In some embodiments, the user interface 1200 further comprises a first link 620, a second link 622, a third link 624, a fourth link 626, and a fifth link 628. In some embodiments, the first link 620 allows the authorized user to directly access all the MOs in all the facilities that can be accessed by the authorized user. In some embodiments, the second link 622 allows the authorized user to access packout information. In some embodiments, the third link 624 allows the authorized user to access and print a plurality of labels. In some embodiments, the fourth link 626 allows an organization of MOs according grow zones. In some embodiments, the fifth link 628 allows the authorized user to navigate back to the homepage. In some embodiments, the user interface 1200 further comprises a button 1214 which allows the authorized to print the PO.

Figure 12B:
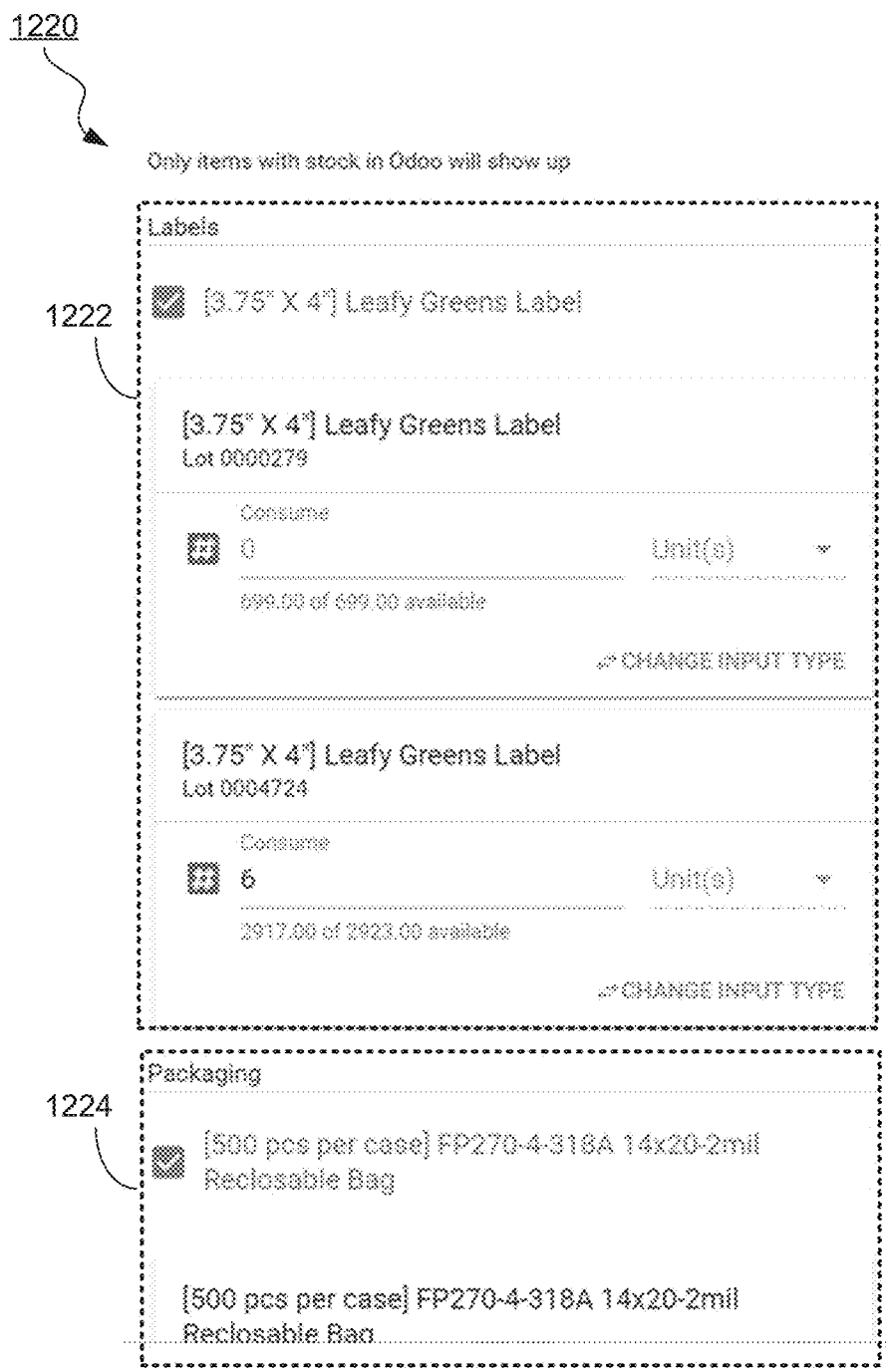
FIG. 12B illustrates an exemplary user interface for fulfilling a product in a packout order (PO) in an order management system, in accordance with some embodiments of the invention.

FIG.12B illustrates an exemplary user interface 1220 for fulfilling a product in a packout order (PO) in an order management system, in accordance with some embodiments of the invention. In FIG.12B, user interface 1220 illustrates the labeling and packaging information that is used for completing PO 1202 from FIG.12A. In some embodiments, the user interface 1220 comprises 2 panels, i.e., a first panel 1222 for selecting a number of labels and a second panel 1224 for selecting a number of packages for fulfilling the product of the PO. In some embodiments, each of the 2 panels in the user interface 1220 further comprises a total number of labels and packages in the inventory. The label information in panel 1222 identifies the label material that can be used to create the product. In the illustrated example of FIG.12B, the user can select 3.75"×4" Leafy Greens Labels from either Lot 0000279 or Lot 0004724. The PO records the materials used to prepare the final product and in the example shown in FIG.12B, the user records using 6 units of the labels from Lot 0004724.

The second panel 1224 of exemplary interface 1220 can be used to guide in the selection of packaging material used in the final product and to track the packaging material used for completing the final product. In the example of FIG.12B, the user is directed to use a 14×20-2 mil Reclosable Bag for the leafy green product. To enable inventory management, the user records the amount of packaging material actually used and the source of inventory for that material in panel 1224 (partially shown) in the interface 1220 of FIG.12B.

Figure 12C:
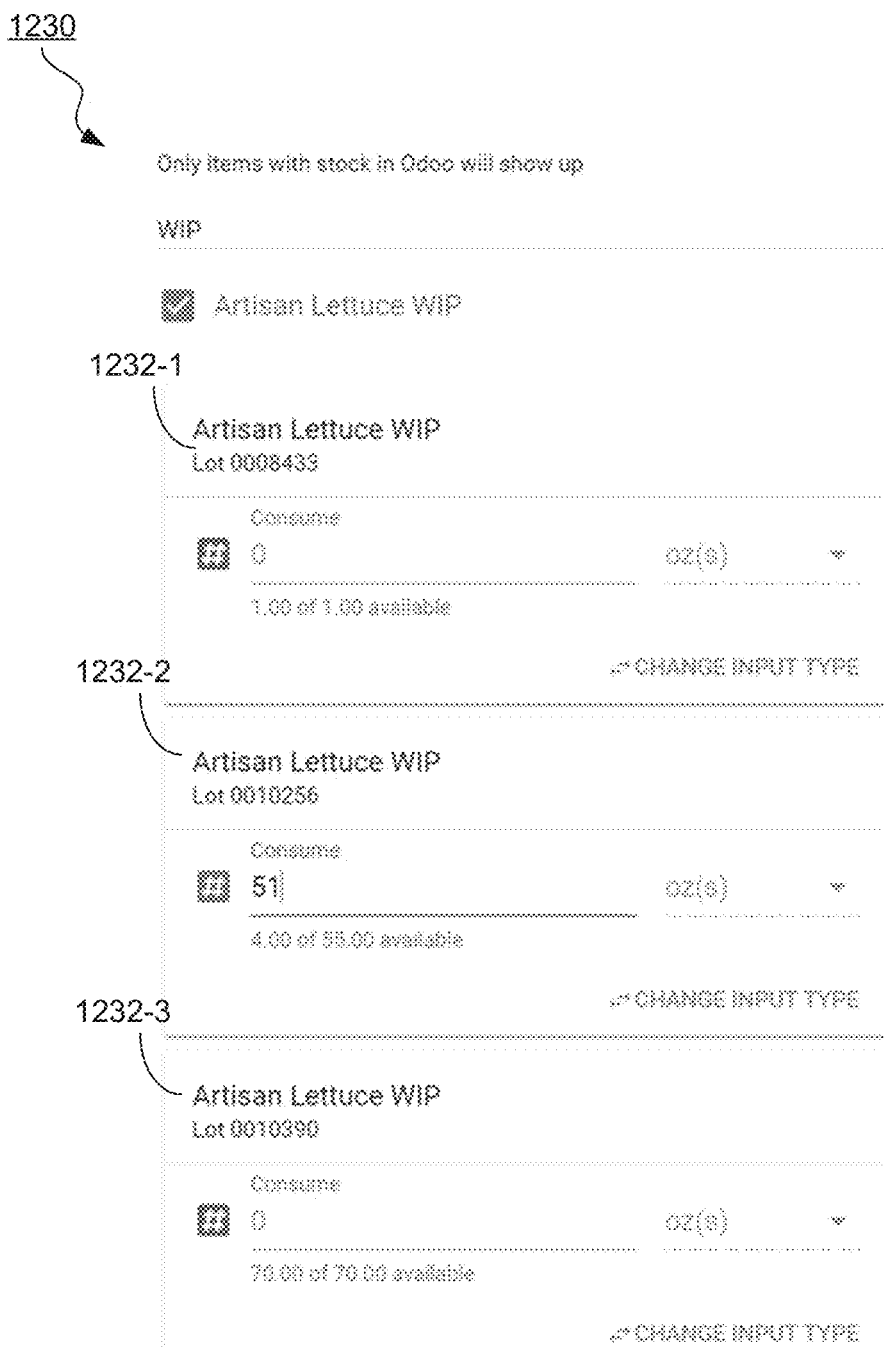
FIG. 12C illustrates an exemplary user interface for fulfilling a product in a packout order (PO) in an order management system, in accordance with some embodiments of the invention.

FIG.12C illustrates an exemplary user interface 1230 for fulfilling a product in a packout order (PO) in an order management system, in accordance with some embodiments of the invention. In FIG.12C, user interface 1230 illustrates the crop or plant information that is used for completing PO 1202 from FIG.12A. In some embodiments, the user interface 1230 is configured for selecting plants from a Harvest Order (HO) which can be used as the product of the PO. In some embodiments, a product can be selected from different HOs each with a different Lot number. In the illustrated embodiments, Artisan Lettuce WIP can be selected from 3 HOs, i.e., a first HO 1232-1 with a Lot number of 0008433, a second HO 1232-2 with a Lot number of 0010256, and a third HO 1232-3 with a Lot number of 0010390. In some embodiments, the user interface 1230 further comprises a total quantity of plants in a HO in the inventory which is received from an inventory data base (i.e., Odoo). The user can also record the actual amount of plants actually used to complete the PO. In this example, the user used 51 oz. of Artisan Lettuce from Lot 0010256 to complete the PO 1202 (FIG.12A) and recorded that information in panel 1232-2 of interface 1230.

Figure 13:
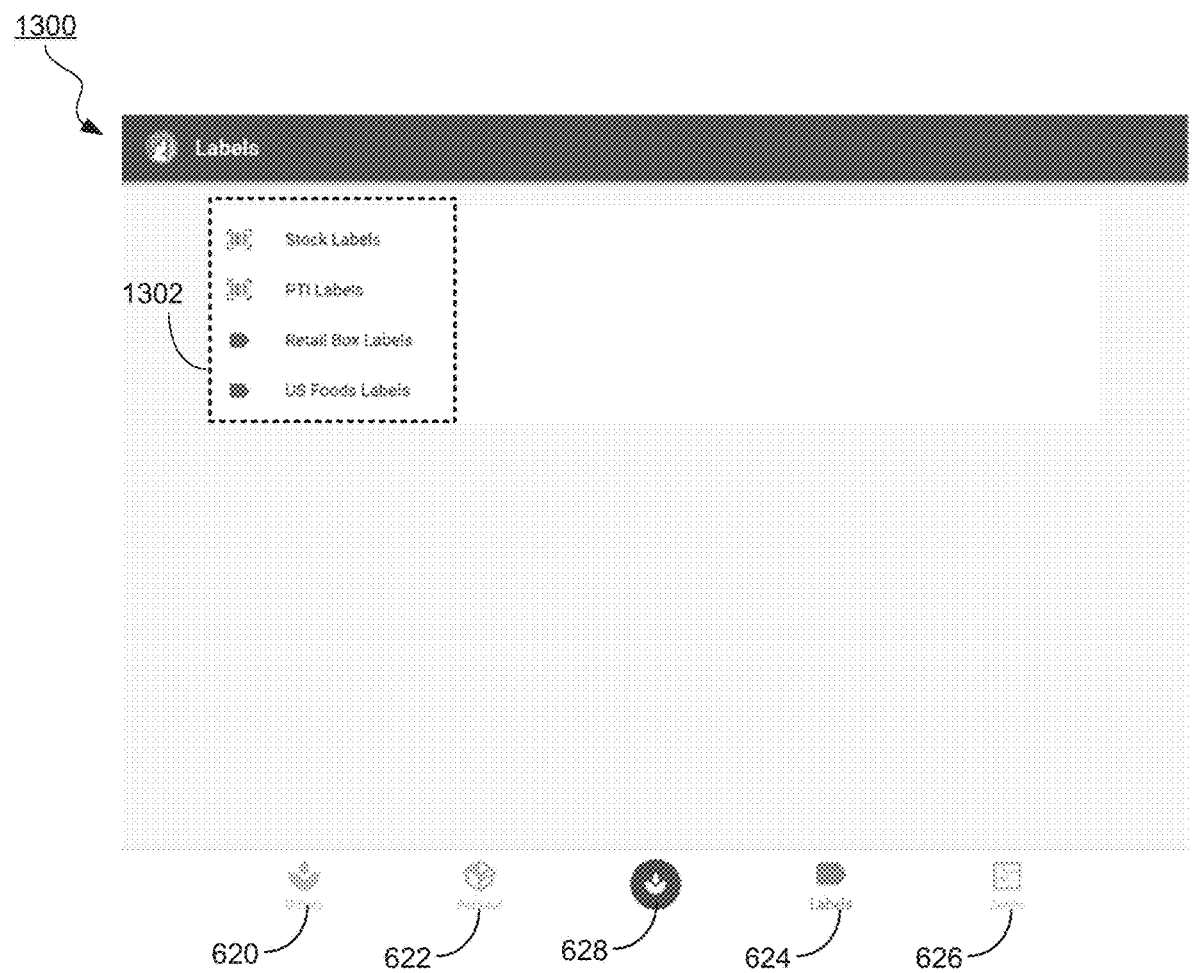
FIG. 13 illustrates an exemplary user interface for creating at least one label in an order management system, in accordance with some embodiments of the invention.

FIG.13 illustrates an exemplary user interface 1300 for creating at least one label in an order management system, in accordance with some embodiments of the invention. In some embodiments, the user interface 1300 comprises a plurality of label options 1302 including Stock Labels, PTI Labels, Retail Box Labels and US Food Labels. In some embodiments, the user interface 1300 further comprises a first link 620, a second link 622, a third link 624, a fourth link 626, and a fifth link 628. In some embodiments, the first link 620 allows the authorized user to directly access all the MOs in all the facilities that can be accessed by the authorized user. In some embodiments, the second link 622 allows the authorized user to access packout information. In some embodiments, the third link 624 allows the authorized user to access and print a plurality of labels. In some embodiments, the fourth link 626 allows an organization of MOs according growth zones. In some embodiments, the fifth link 628 allows the authorized user to navigate back to the homepage.

Figure 14A:
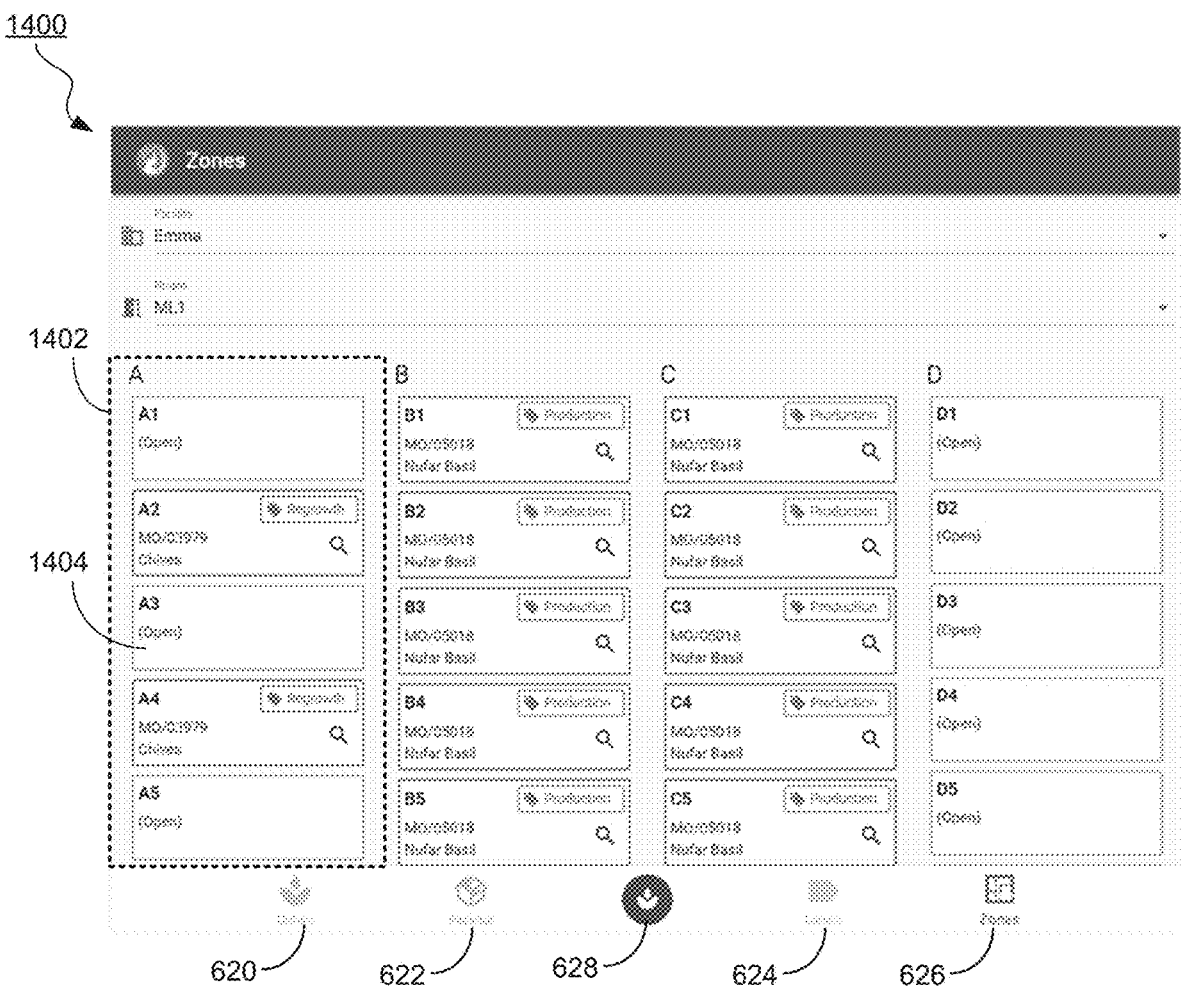
FIG. 14A illustrates an exemplary user interface 1400 of a homepage for tracking grow zone production in an order management system, in accordance with some embodiments of the invention.

FIG.14A illustrates an exemplary user interface 1400 of a homepage for tracking grow zone production in an order management system, in accordance with some embodiments of the invention. In the illustrated embodiment, the user interface 1400 of the homepage of grow zones comprises 4 panels 1402 corresponding to 4 zones in an indoor growing module of a facility. In some embodiments, a facility may comprise a plurality of indoor growing modules or grow zones. In some embodiments, each of the 4 panels 1402 further comprises a plurality of sub-panels 1404 corresponding to a plurality of physical plots (e.g., A1, A2, A3, A4 and A5) in a first zone A. In some embodiments, each of the plurality of sub-panels 1404 further comprises a manufacturing order (MO) number and a type of plants. In some embodiments, when a physical plot in a zone in an indoor growing module of a facility is unoccupied, the physical plot is indicated as open. In some embodiments, the user interface 1400 further comprises a first link 620, a second link 622, a third link 624, a fourth link 626, and a fifth link 628. In some embodiments, the first link 620 allows the authorized user to directly access all the MOs in all the facilities that can be accessed by the authorized user. In some embodiments, the second link 622 allows the authorized user to access packout information. In some embodiments, the third link 624 allows the authorized user to access and print a plurality of labels. In some embodiments, the fourth link 626 allows an organization of MOs according growth zones. In some embodiments, the fifth link 628 allows the authorized user to navigate back to the homepage.

Figure 14B:
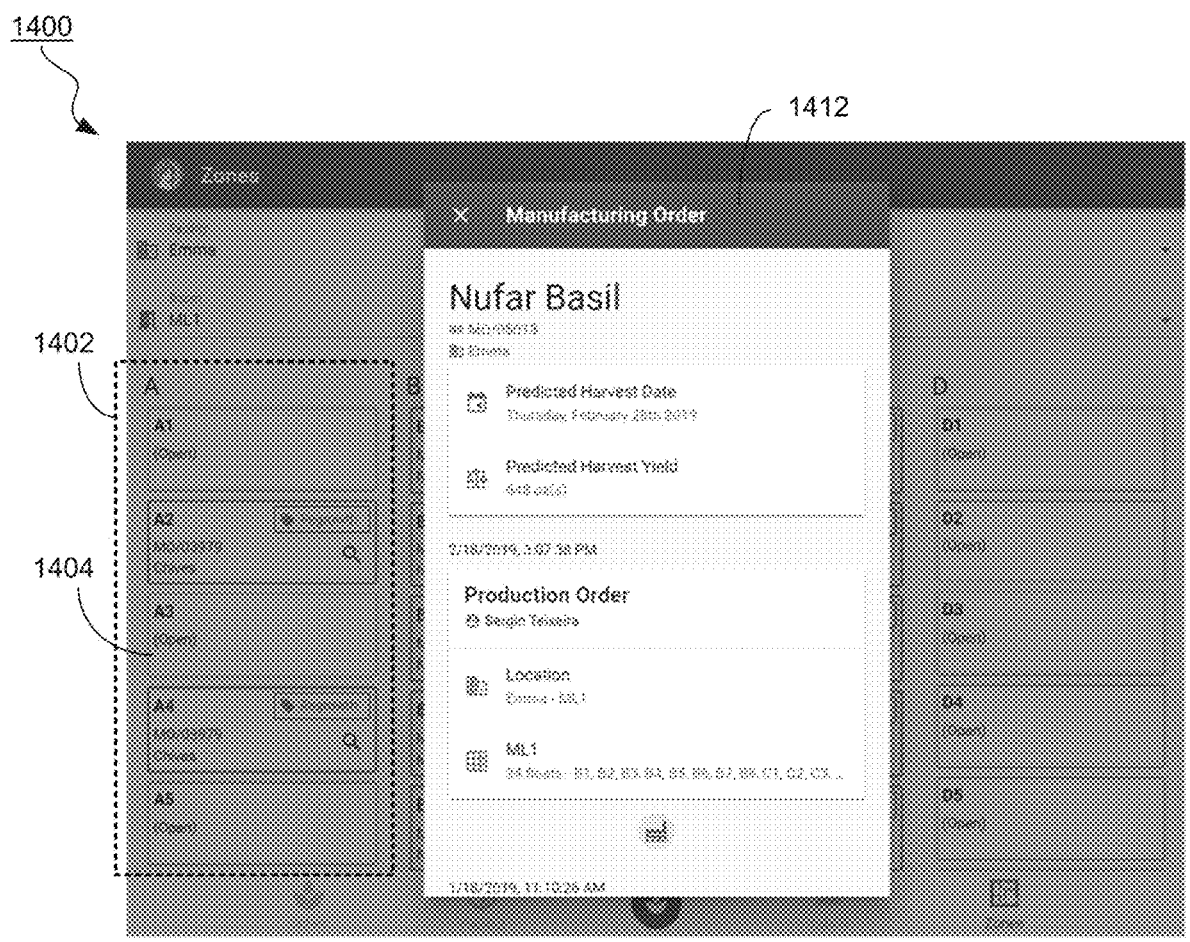
FIG. 14B illustrates an exemplary user interface of a manufacturing order (MO) in a plot of a zone in an order management system, in accordance with some embodiments of the invention.

Manufacturing information associated with a grow zone or sub-panel 1404 can be accessed from user interface 1400. FIG.14B shows a pop-up window 1412 in the user interface 1400, in which a MO history of the plants in a plot is listed. In some embodiments, the MO history comprises information of creation of the MO, information of a germination order, information of a production order, and predicted harvest date and yield, which is discussed in detail in FIG.8 above.

Figure 15:
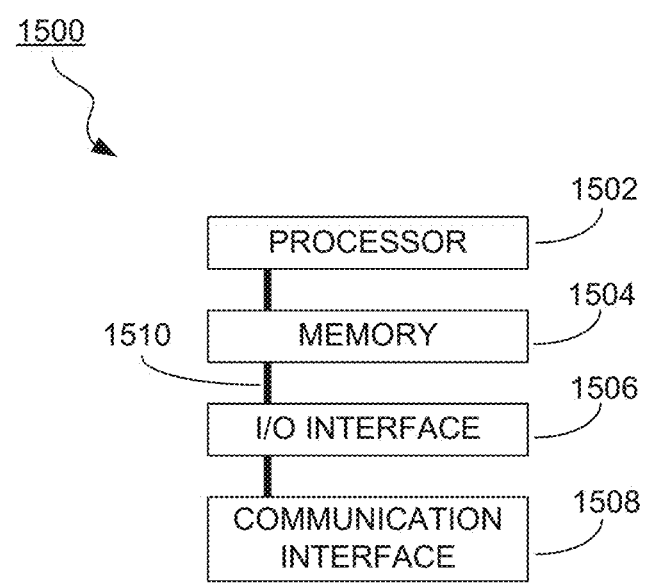
FIG. 15 illustrates an exemplary block diagram of a controller in an indoor farming facility, in accordance with some embodiments of the invention.

FIG.15 illustrates an exemplary block diagram of a controller 1500 in an indoor farming facility, in accordance with some embodiments of the invention. It is noted that the controller 1500 is merely an example, and is not intended to limit the invention. Accordingly, it is understood that additional functional blocks may be provided in or coupled to the controller 1500 of FIG.15, and that some other functional blocks may be omitted or only briefly described herein. It should be also noted that the functionalities provided in each of the components and modules of the controller 1500 can be combined or separated into one or more modules.

In the illustrated embodiment, the controller 1500 comprises a processor 1502, a memory 1504, an input/output interface 1506, a communications interface 1508, and a system bus 1510, in accordance with some embodiments. The processor 1502 may comprise any processing circuitry operative to control the operations and performance of the indoor farming modules in the indoor farming facility and the tray-handling system. In various aspects, the processor 1502 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor 1502 also may be implemented by a controller, a microcontroller, an application specific integrated circuit (ASIC), a field programmable gate array (FPGA), a programmable logic device (PLD), and so forth.

In various aspects, the processor 1502 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory 1504.

In some embodiments, the memory 1504 may comprise any machine-readable or computer-readable media capable of storing data, including both volatile/non-volatile memory and removable/non-removable memory. The memory 1504 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the robot controller 912 of the tray-handling system 900.

For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory 1504 may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor.

In some embodiments, the I/O interface 1506 may comprise any suitable mechanism or component to enable a user to provide input to the indoor farming modules in the indoor farming facility to provide output to the user. For example, the I/O interface 1506 may comprise any suitable input mechanism, including but not limited to, a button, keypad, keyboard, click wheel, touch screen, or motion sensor. In some embodiments, the I/O interface 1506 may comprise a capacitive sensing mechanism, or a multi-touch capacitive sensing mechanism (e.g., a touchscreen).

In some embodiments, the I/O interface 1506 may comprise a visual peripheral output device for providing a display visible to the user. For example, the visual peripheral output device may comprise a screen such as, for example, a Liquid Crystal Display (LCD) screen, incorporated into the indoor farming modules. As another example, the visual peripheral output device may comprise a movable display or projecting system for providing a display of content on a surface remote from indoor farming facility. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both.

The visual peripheral output device may be operative to display content under the direction of the processor. For example, the visual peripheral output device may be able to play media playback information, application screens for applications implemented on the indoor farming modules, information regarding ongoing communications operations, information regarding incoming communications requests, or device operation screens, to name only a few.

In some embodiments, the communications interface 1508 may comprise any suitable hardware, software, or combination of hardware and software that is capable of coupling the indoor farming modules of a plurality of indoor farming facilities to one or more networks and/or additional devices. The communications interface 1508 may be arranged to operate with any suitable technique for controlling information signals using a desired set of communications protocols, services or operating procedures. The communications interface 1508 may comprise the appropriate physical connectors to connect with a corresponding communications medium, whether wired or wireless.

Systems and methods of communication comprise a network, in accordance with some embodiments. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a circuit generating system, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 1508 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface may comprise a wireless interface comprising one or more antennas, transmitters, receivers, transceivers, amplifiers, filters, control logic, and so forth.

In various embodiments, the communications interface 1508 may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electromagnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

The system bus 1510 couples the processor 1502, the memory 1504, the I/O interface 1506, and the communication interface 1508 to one another, as necessary. The system bus 1510 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MCA), Extended ISA (EISA), Intelligent Drive Electronics (IDE), VESA Local Bus (VLB), Personal Computer Memory Card International Association (PCMCIA) Bus, Small Computer System Interface (SCSI) or other proprietary bus, or any custom bus suitable for computing device applications.

Figure 16:
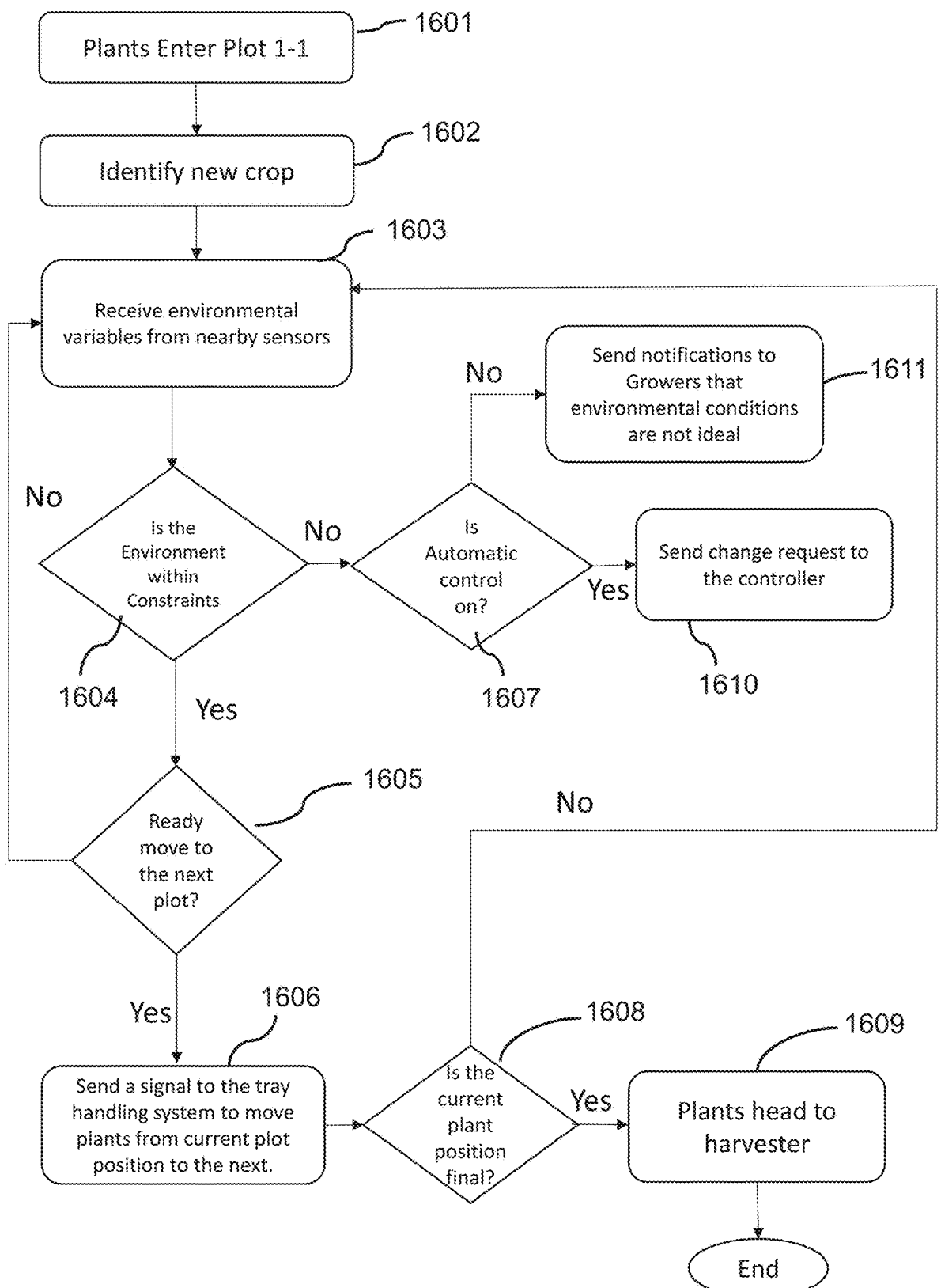
FIG. 16 illustrates an exemplary diagram of an automated indoor farming method.

FIG. 16 illustrates an exemplary diagram of an automated indoor farming method. At step 1601, in accordance to some embodiments of the invention, a plurality of plants are placed into a plot located at an initial position (e.g., 1-1). Next, at step 1602, the indoor farming method identifies the plants within the plot. In some embodiments, the vision system may be utilized to identify the plants within the plot. For example, the vision system may classify the species and variety of plants within the plot. At step 1603, environmental variables from a plurality of sensors located nearby the plot are received. In various embodiments, the plurality of sensors include temperature sensors, conductivity sensors, and $O_2$ level sensors. At step 1604, the indoor farming method determines if the received environmental variables are within predetermined constraints. As such, if at least one of the received environmental variables is outside of the predetermined constraints, the indoor farming method sends a change request to the environment controller based on determining whether an automatic control is enabled and, otherwise, sends notifications to the growers indicating that the environmental variables are not within the predetermined constraints if the automatic control is disabled. If each of the received environmental variables is within predetermined constraints, the indoor farming method, at step 1605, determines whether the plants located in the current plot are ready to be moved to a subsequent growing plot. In some embodiments, the determination at step 1605 is based on the growing conditions of the plants located in the current plot. As such, if the plants are not ready to be moved to the subsequent growing plot, the indoor farming method continues monitoring the environmental variables. On the other hand, if the plants are ready to be moved to the subsequent growing plot, at step 1606, the indoor farming method sends a signal to the tray handling system, wherein the sent signal comprises instruction for transporting plants from their current growing plot to the next growing plot. At step 1608, the indoor farming method determines if the current growing plot of the plants is a final position. In this regard, if the result of determination at step 1608 is true, plants are headed for a harvester at step 1609. On the other hand, if the result of determination at step 1608 is false, the indoor farming method continuous monitoring the environmental variables.

Figure 17:
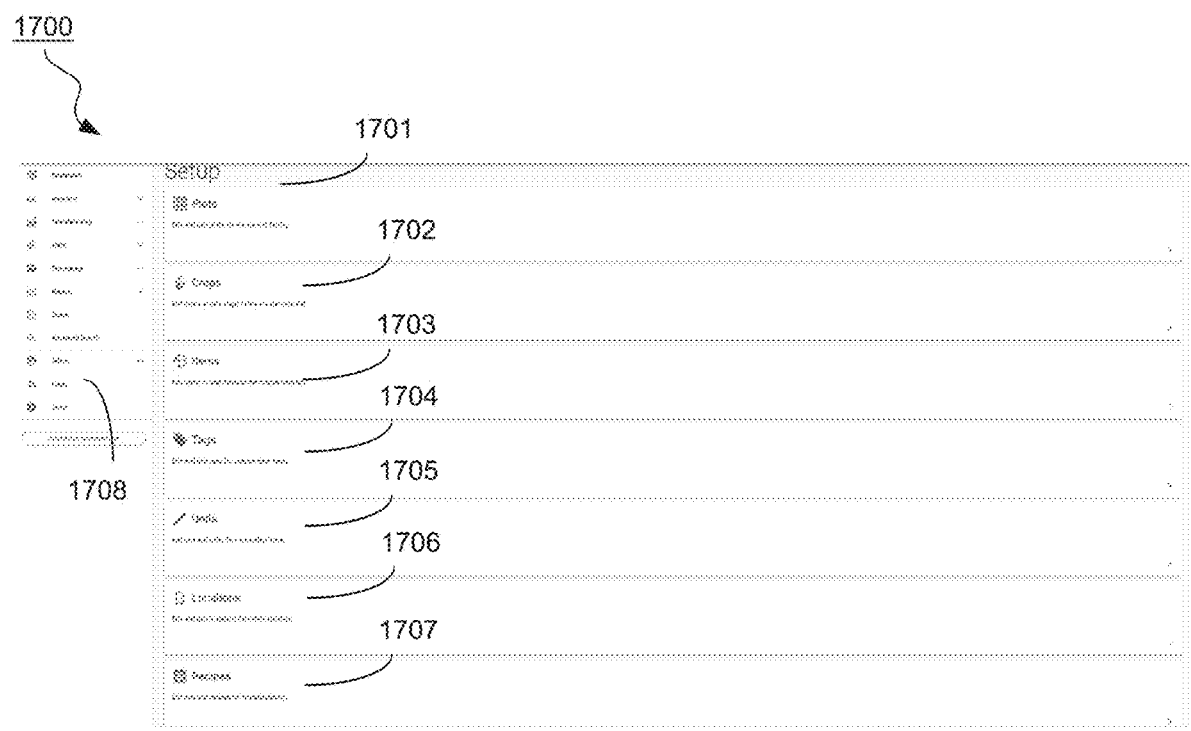
FIG. 17 illustrates an exemplary user interface of an administrator panel for setting operational and environmental parameters of indoor farms, in accordance with some embodiments of the invention.

FIG.17 illustrates an exemplary user interface 1700 of an administrator panel for setting operational and environmental parameters of indoor farms, in accordance with some embodiments of the invention. For example, the administrator panel 1700 comprises at least one of the following fields configured to set operational and environmental parameters of indoor farms as well as its operations: a Plots field 1701 for specifying physical spaces used to grow plants, a Crops field 1702 for defining the crops grown in the indoor farms, an Item field 1703 for specifying a list of definitions of each item used in production, a Tags field 1704 for defining a list of distinct terms, a Units field 1705 for specifying units of measurements, a Locations field 1706 for defining storage locations that exist at each indoor farms, a Recipes field 1707 for specifying a list of ingredients or instructions for creating an item. In some embodiments, the administrator panel 1700 comprises a navigation menu 1708 configured to include options for the user to select a destination tab.

In other embodiments, the operational and environmental parameters of the indoor farms may be dynamically configured based on external reports indicating forecasted demand for each product grown in the indoor farms. As such, the forecasted demand may be used determine what the on-hand stock should be to fulfill the forecasted demand. The system can use past yield and plant production information to create a plan for meeting the forecasted demand. The system can calculate the number of plots necessary to grow the required crops and develop a seed plan, including determining the location, timing and amount of seed necessary for the planting.

Figure 18A:
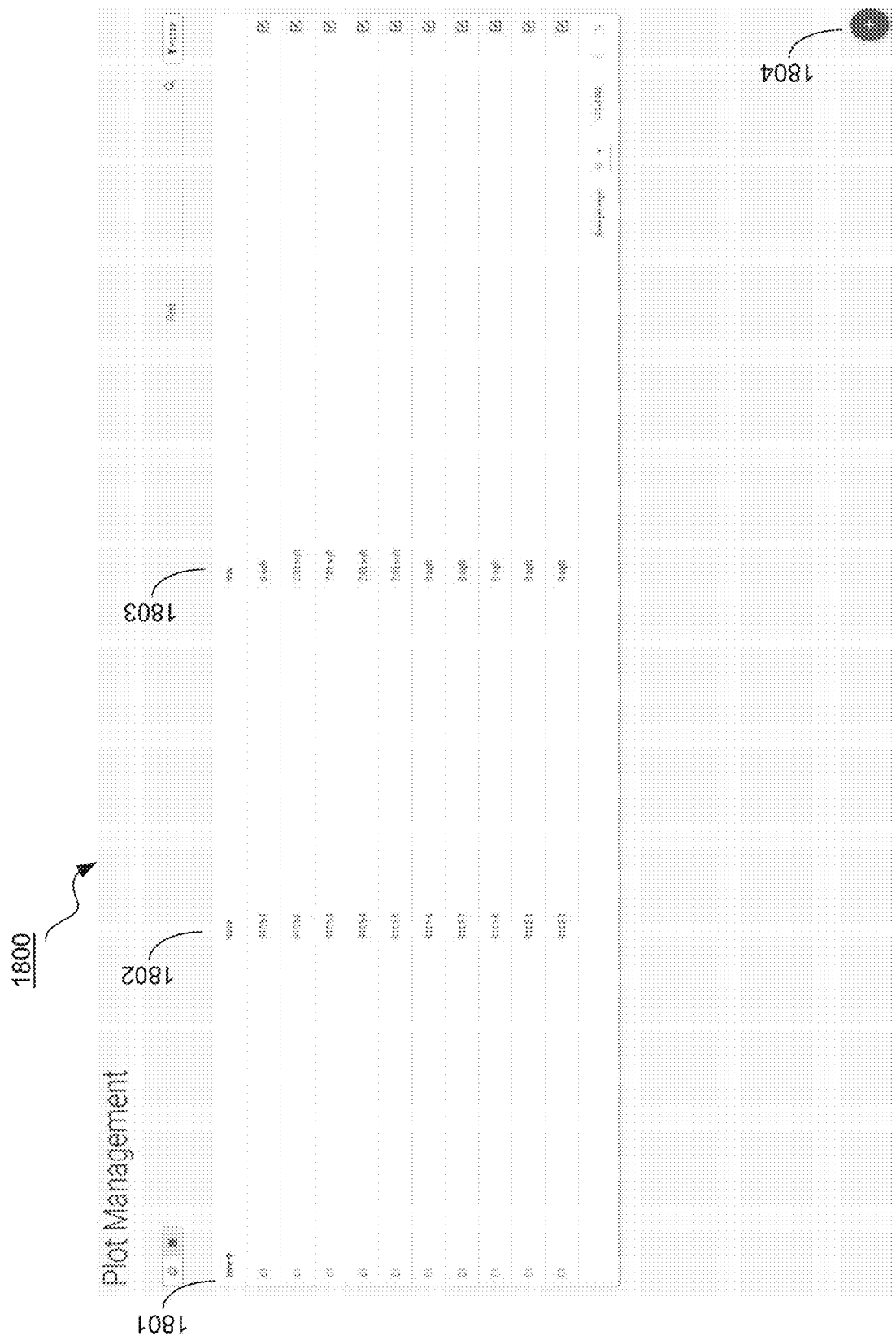
FIG. 18A illustrates an exemplary user interface for plot management, in accordance with some embodiments of the invention.

FIG.18A illustrates an exemplary user interface 1800 for plot management, in accordance with some embodiments of the invention. As shown in FIG.18A, the user interface 1800 allow users to divide the physical space of an indoor farm into plots of various sizes. In some embodiments, the user interface 1800 provides a human readable name 1802 for each plot, a zone identifier 1801 for specifying an area of the building where each plot is located, and a size 1803 for specifying the square footage of each plot. In this example, the user interface 1800 also provides a button 1804 in the bottom right configured to bring up a new plot registration box.

Figure 18B:
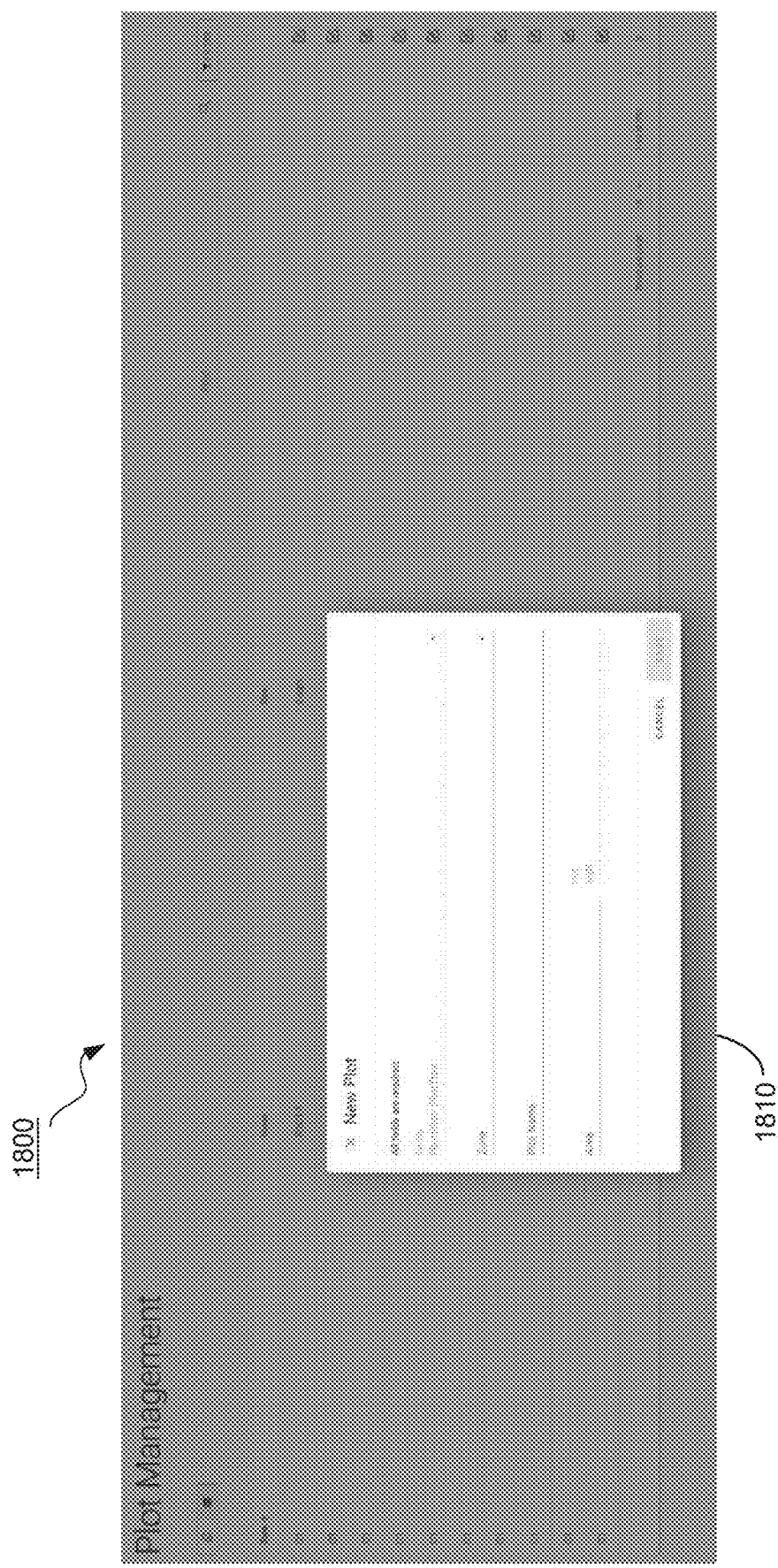
FIG. 18B illustrates a new plot registration feature of an exemplary user interface, in accordance with some embodiments of the invention.

FIG.18B illustrates a new plot registration feature of the exemplary user interface 1800, in accordance with some embodiments of the invention. In the illustrated embodiment, the user interface 1800 comprises a pop-up window 1810 which allows an authorized user to set up a new plot. In this example, the user can provide the name, the zone identifier, and the size in square footage for the new plot. In some embodiment, the registered plots are subsequently used by the order management system as spaces available for growing plants. Moreover, each MO is assigned to at least one plot. The registered plots can also be used by the order management system to track the inventory and status of crop growth as described above.

Figure 19A:
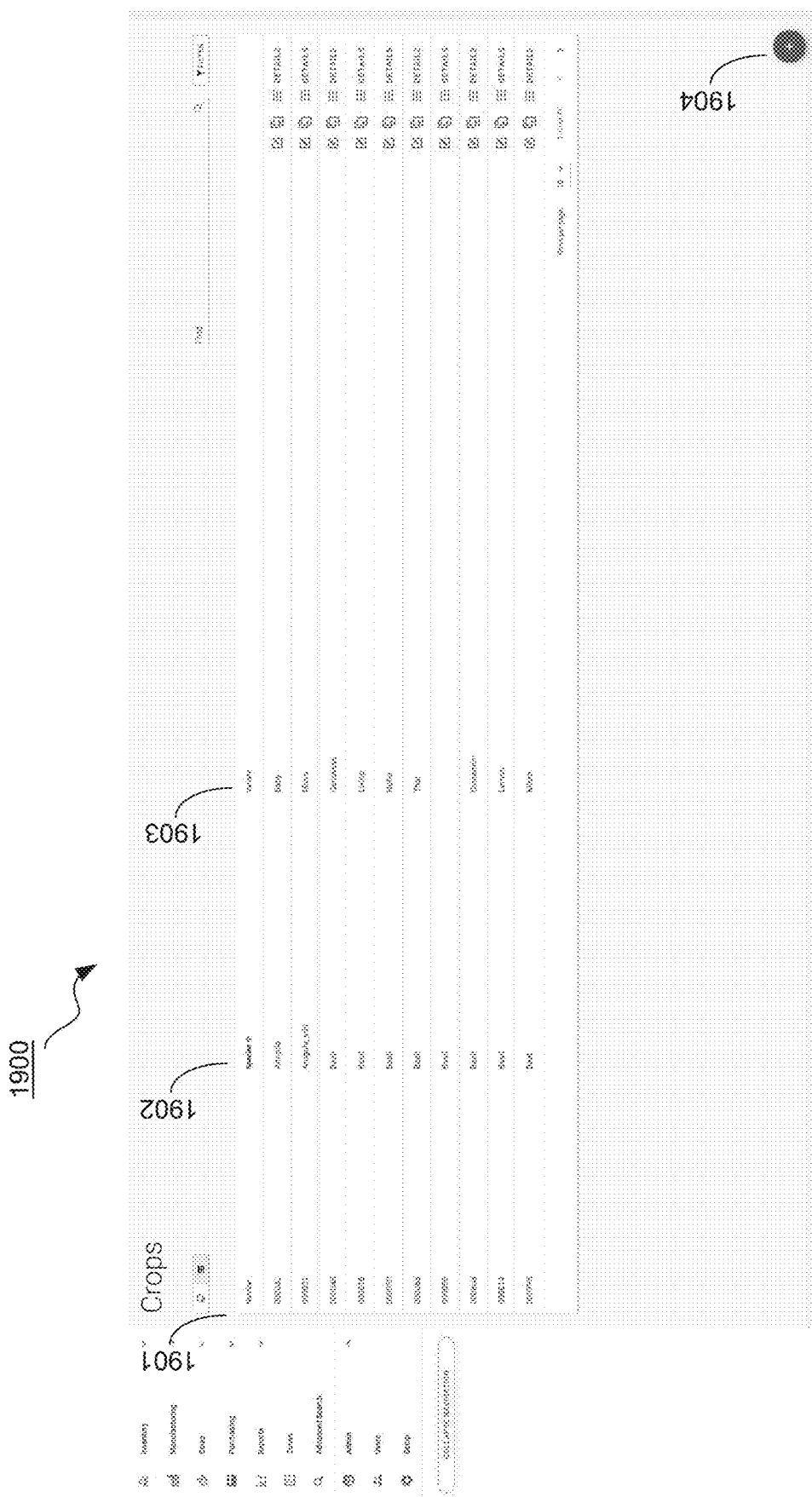
FIG. 19A illustrates an exemplary user interface for defining crops grown in an indoor farm, in accordance with some embodiments of the invention.

FIG.19A illustrates an exemplary user interface 1900 for defining crops grown in the indoor farming module, in accordance with some embodiments of the invention. For example, the exemplary user interface 1900 may display a unique identifier 1901 associated with the displayed crop. In some embodiments, the exemplary user interface 1900 may display species 1902 and a varieties 1903 of grown crops. Moreover, the exemplary user interface 1900 may display a button or a user interface (UI) element 1904 configured to allow users to specify new crops. In addition, a button or a user interface (UI) element 1904 may also be configured to allow users to edit predefined crops.

Figure 19B:
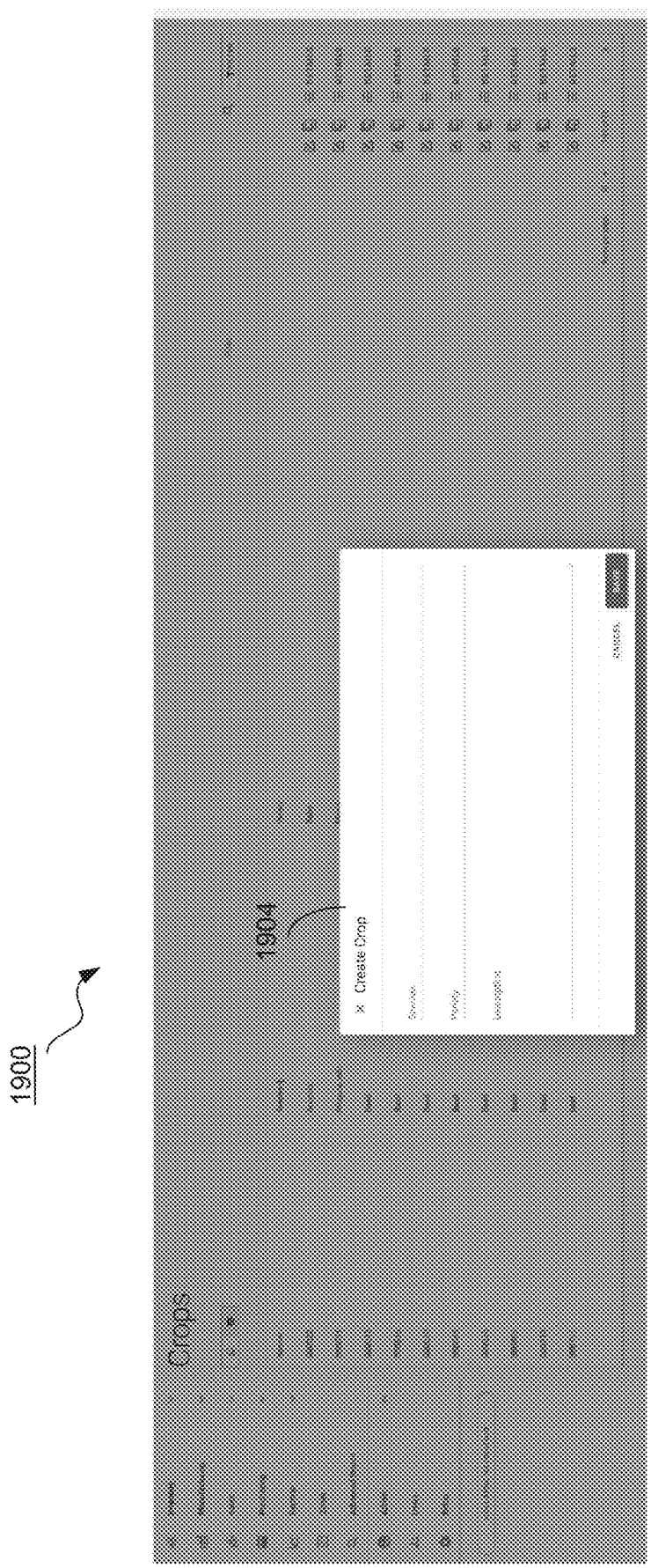
FIG. 19B illustrates a new recipe registration feature of an exemplary user interface, in accordance with some embodiments of the invention.

FIG.19B illustrates a new recipe registration feature of the exemplary user interface 1900, in accordance with some embodiments of the invention. In the illustrated embodiment, the user interface 1900 comprises a pop-up window which allows an authorized user to specify a new crop 1904. In this example, the user may select a species and a variety names of the new crop. The user may also provide a description for the new crop 1904.

Figure 19C:
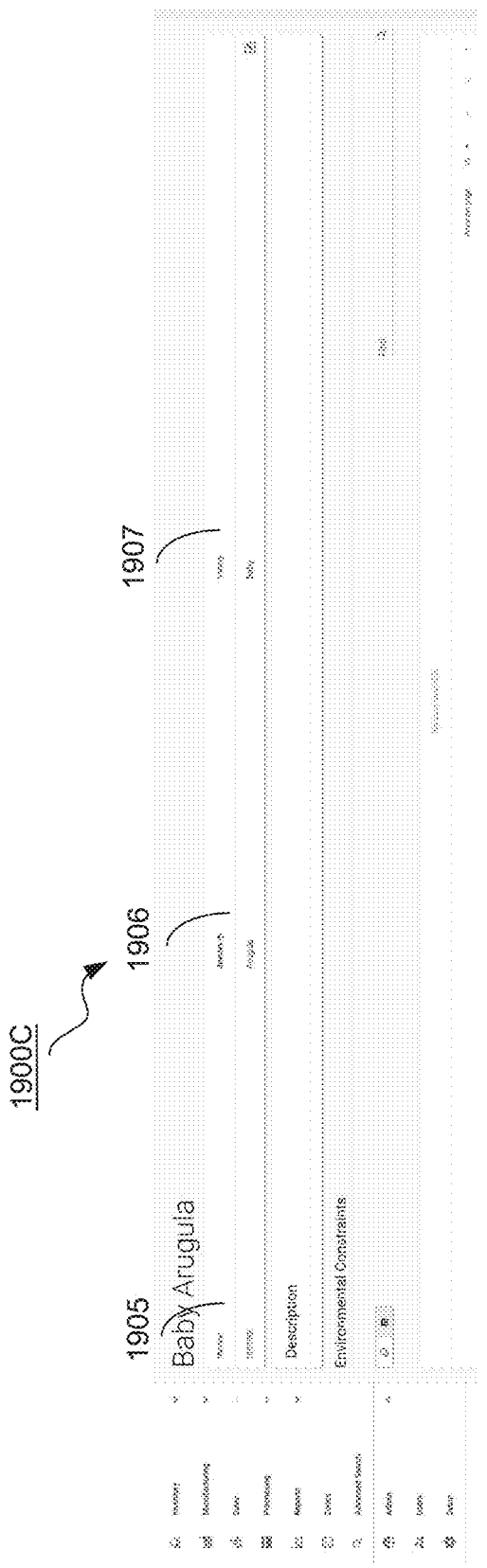
FIG. 19C illustrates an exemplary user interface configured to display details of a new crop, in accordance with some embodiments of the invention.

FIG.19C illustrates an exemplary user interface 1900C configured to display details of the new crop specified in the exemplary user interface 1900, in accordance with some embodiments of the invention. In some embodiments, the exemplary user interface 1900C may be automatically displayed after the user specifies the new crop in the user interface 1900, shown in FIG.19B. In other embodiments, the user may manually navigate to the user interface 1900C. As shown in FIG.19C, the exemplary user interface 1900C may display a unique identifier 1905 associated the new crop as well as its species and variety names 1905 and 1907, respectively. In further embodiments, the exemplary user interface 1900C may display environmental constrains associated with the crop. For example, the displayed environmental constrains may include a desired temperature, humidity, and/or airflow. Furthermore, the exemplary user interface 1900C may provide a button or a UI element configured to edit or create a recipe of materials needed to grow the crop displayed in the user interface 1900C. Moreover, the button or the UI element may also be configured to allow the user to edit or define a list of harvestable products from the crop specified in the exemplary user interface 1900.

Figure 19D:
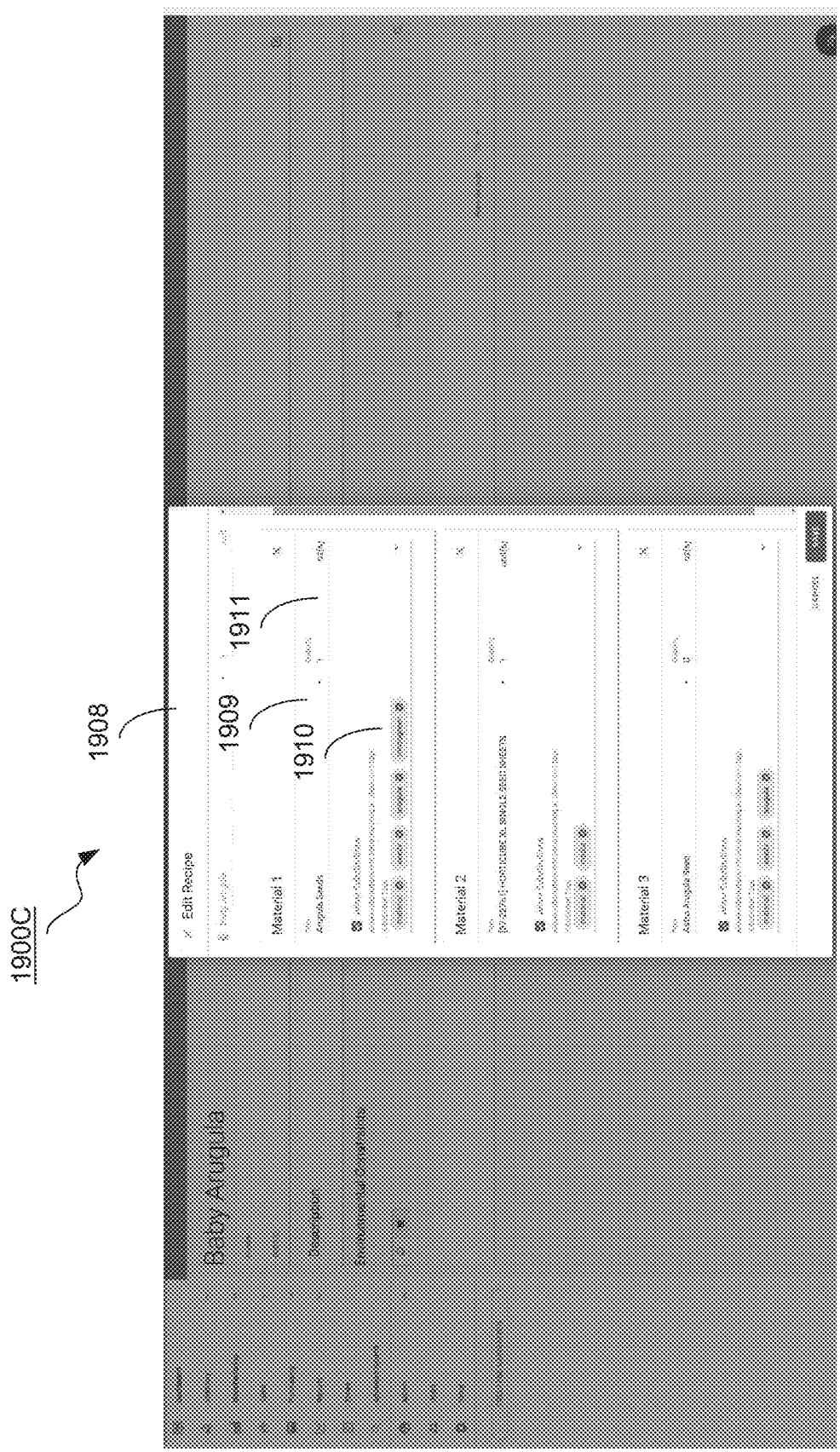
FIG. 19D illustrates a new recipe registration feature of an exemplary user interface, in accordance with some embodiments of the invention.

FIG.19D illustrates a new recipe registration feature of the exemplary user interface 1900C, in accordance with some embodiments of the invention. In the illustrated embodiment, the user interface 1900C comprises a pop-up window which allows an authorized user to specify a new recipe 1908 that specifies the materials needed to grow the crop specified in the exemplary user interface 1900. In this example, the user may select one or more materials from a drop down menu 1909 along with amounts 1911 of at least one or more materials used in growing the crop. Moreover, in some embodiments, the user may specify one or more substitute materials 1910 in the event the one or more primary materials 1909 are not available. In the exemplary embodiment, to grow an Arugula plant, one ounce of Arugula seeds, one unit of Horticube (a growing media the seed goes in) may be used. Furthermore, as illustrated in the exemplary embodiment, if the "Allow Substitutions" box is selected, the user may pick a list of substitute materials labeled with 'tags'. Unlike a typical bill of materials in a standard Material Requirements Planning system, which are fixed and rigid, the new recipe feature of the exemplary user interface allows a user creating a new recipe to select any material in the system. Moreover, using the 'tags' identifiers, the user can filter the list of available materials to only the most relevant, rather than having to page through the entire list of every available material in the system. This results in a much improved material requirements planning system.

Figure 19E:
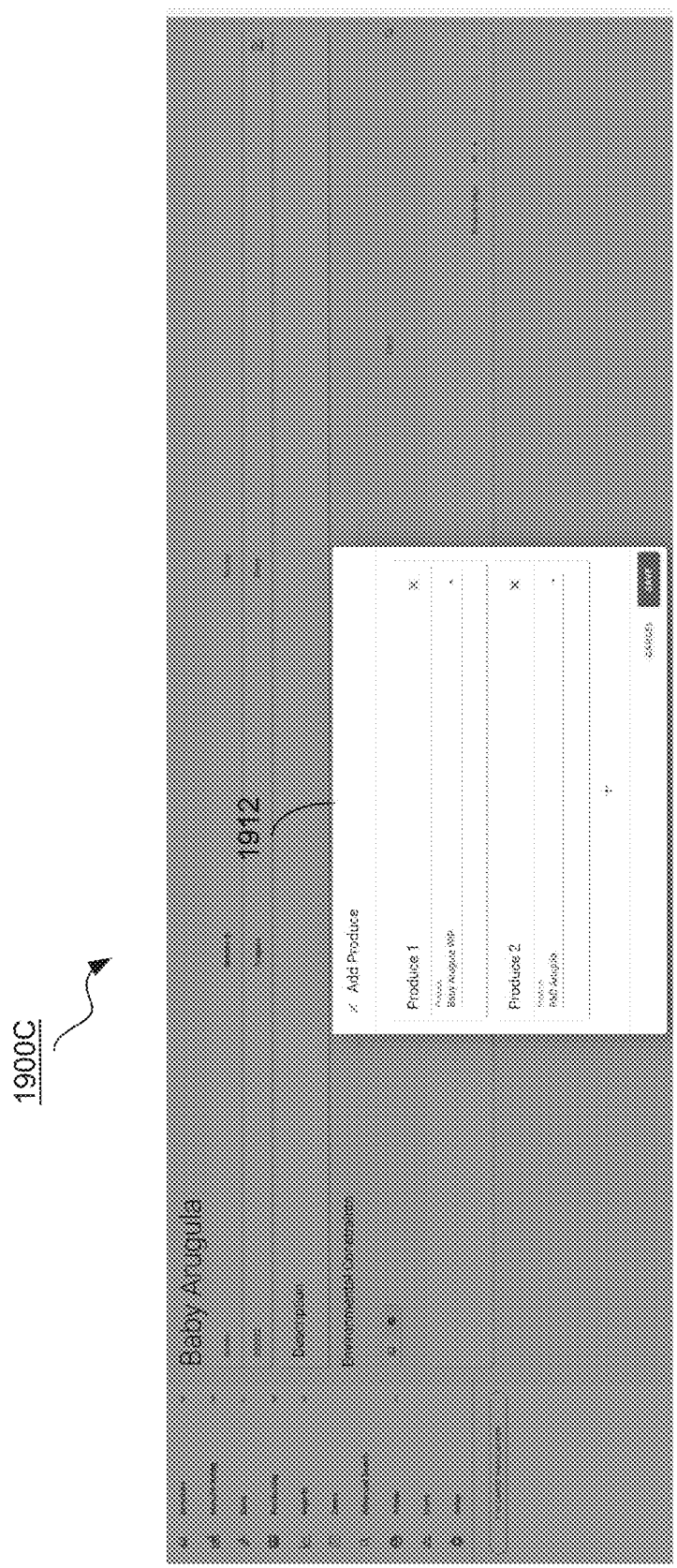
FIG. 19E illustrates a list of harvestable products registration feature of an exemplary user interface, in accordance with some embodiments of the invention.

FIG.19E illustrates a list of harvestable products registration feature of the exemplary user interface 1900C, in accordance with some embodiments of the invention. In the illustrated embodiment, the user interface 1900C comprises a pop-up window 1912 that allows an authorized user to define a list of harvestable products from a plant.

Figure 20A:
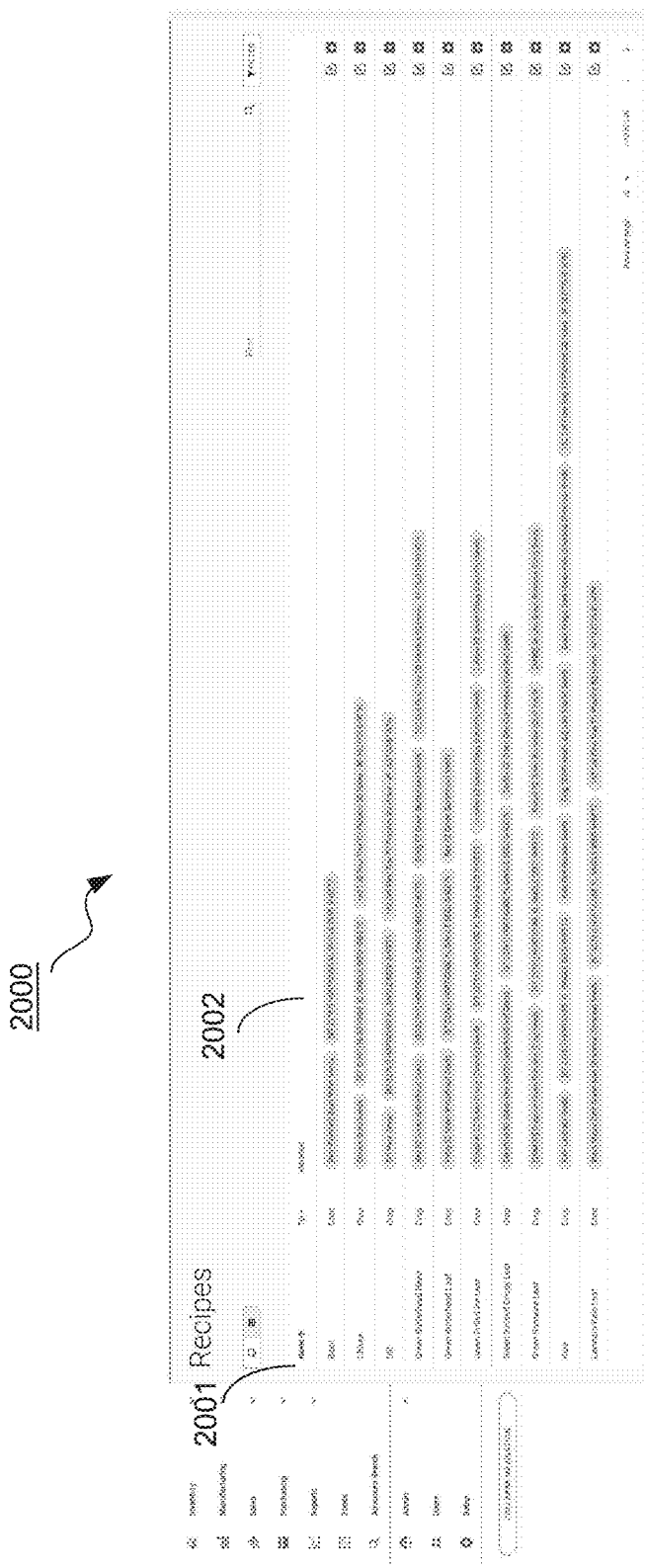
FIG. 20A illustrates an exemplary user interface for displaying as well as specifying materials used in producing items in accordance with some embodiments of the invention.

FIG.20A illustrates an exemplary user interface 2000 for displaying as well as specifying materials used in producing items 2001, in accordance with some embodiments of the invention. For example, the exemplary user interface 2000 may specify recipe comprising a plurality of materials 2003 used in producing items 2001. In some embodiments, the plurality of materials 2003 may be referred to as a Bill of Materials (BoMs). In other embodiments, the user interface 2000 may include a button or an element configured to allow users to create a new recipe.

Figure 20B:
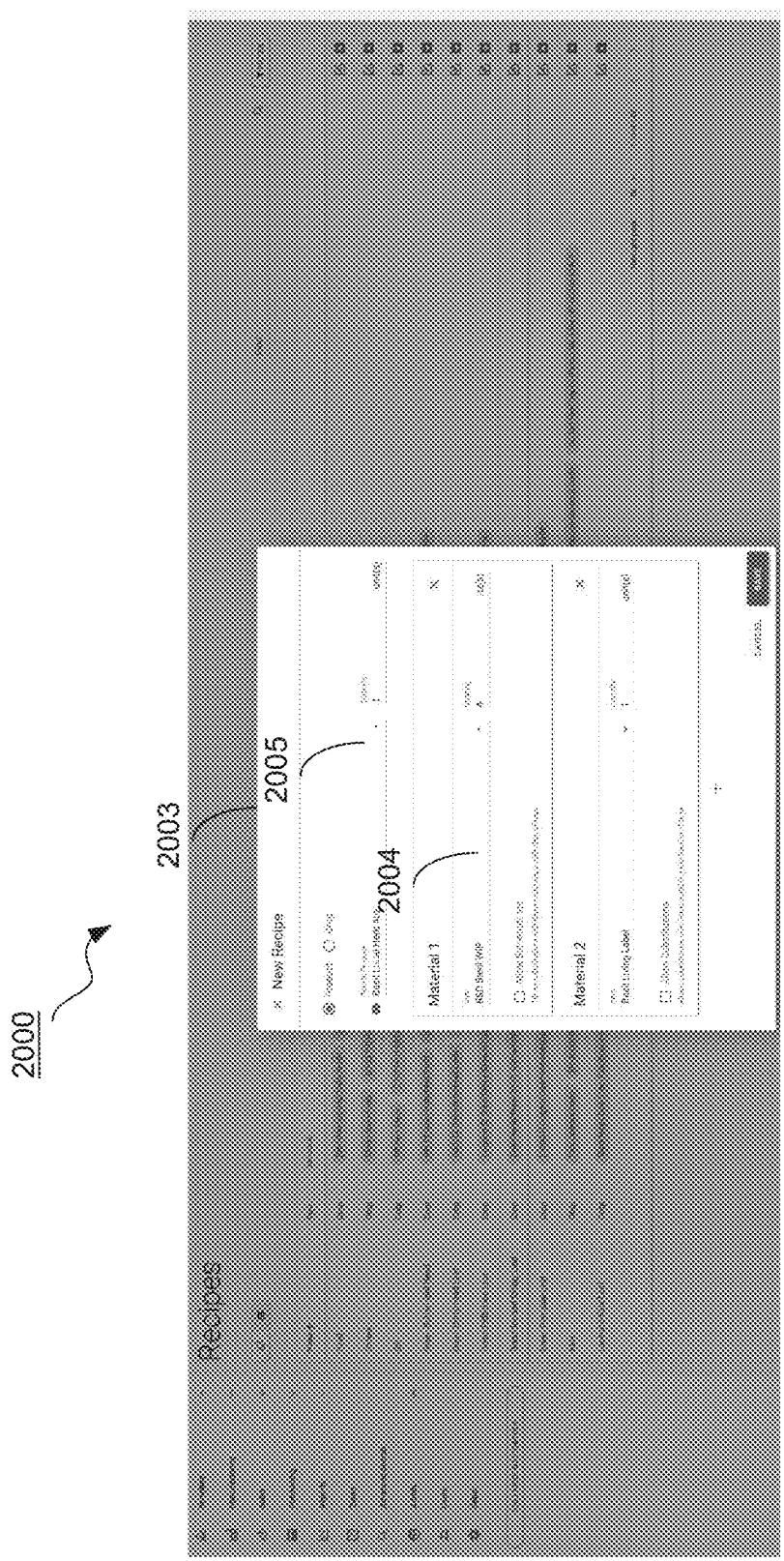
FIG. 20B illustrates a new recipe registration feature of an exemplary user interface, in accordance with some embodiments of the invention.

FIG.20B illustrates a new recipe registration feature of the exemplary user interface 2000, in accordance with some embodiments of the invention. In the illustrated embodiment, the user interface 1800 comprises a pop-up window which allows an authorized user to create a new recipe 2003. In this example, the user may select an item from a drop down menu 2005 for which the new recipe is created. As shown in FIG.20B, the user may specify one or more materials 2004 and their quantity while creating the new recipe 2003. Moreover, in some embodiments, the user may specify substitute materials in the event the one or more primary materials 2004 are not available. Additionally, using the 'tags' identifiers, the user can filter the list of available materials to only the most relevant, rather than having to page through the entire list of every available material in the system. As described above, the exemplary order management system results in a much improved material requirements planning system.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the invention should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the invention.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for remotely controlling an indoor farming module, the indoor farming module comprising at least one controller, a plurality of sensors, an irrigation system, a lighting system, and an air circulation system, the method comprising:
obtaining, by the plurality of sensors located in the indoor farming module, a plurality of data;
receiving, by the at least one controller the plurality of data, wherein the plurality of data is associated with at least one of: a water level in a watering reservoir, a pH level in the irrigation system, a temperature in the indoor farming module, a humidity level in the indoor farming module, a carbon dioxide ($CO_2$) level in the indoor farming module, and a power relay status;
filtering the received plurality of data on a remote computer based on a user-selectable filtering field in a user interface, the user interface comprising a plurality of panels, the filtering field configured to filter the received plurality of data based on a device category from a plurality of devices in the indoor farming module;
displaying, in each panel of the plurality of panels in the user interface, the filtered data, wherein each panel of the plurality of panels is configured to display the filtered data for a device of the plurality of devices in the indoor farming module;
configuring a plurality of schedules for the irrigation system, the lighting system, and the air circulation system using the user interface, wherein the plurality of schedules comprise an irrigation schedule, a lighting schedule, and a data collection schedule;
sending the configured plurality of schedules to one or more controllers the at least one controller of the indoor farming module; and
performing at least one farming action in the indoor farming module using the at least one of the irrigation system, the lighting system and the air circulation system.

2. The method of claim 1, wherein the plurality of data comprises temperature and humidity recordings in a predefined period of time.

3. The method of claim 1, further comprising:
configuring a recurring interval for the plurality of schedules.

4. The method of claim 1, wherein the plurality of schedules are configured to control a plurality of associated power relays.

5. The method of claim 1 further comprising:
displaying, on at least one panel of the user interface, a first curve of recorded temperatures and a second curve of recorded humidity levels.

6. The method of claim 1 further comprising:
displaying, on at least one panel of the user interface, an information list of each of the plurality of devices.

7. The method of claim 6, wherein the information list comprises at least one of a type, a status, an IP address, a recent activity, and a tag of at least one of the plurality of devices.

8. The method of claim 1, wherein:
selection in the filtering field is configured to cause a panel to be displayed on the user interface for each device represented in the filtered data.

9. The method of claim 1, further comprising:
identifying at one or more characteristics of plants in the indoor farming module, the one or more characteristics comprising at least one of a species and a variety of the plants.

10. The method of claim 1, wherein the indoor farming module further comprises a handling system, and the method further comprises:
determining whether plants in the indoor farming module are ready to be moved from a first plot in the indoor farming module to a second plot in the indoor farming module based on the plurality of data; and
sending a signal to a handling system when the plurality of data indicates that the plants are ready to be moved, the signal comprises an instruction for transporting the plants from the first plot to the second plot; and
moving the plants from the first plot to the second plot using the handling system.

11. The method of claim 1, further comprising:
displaying, on at least one of the plurality of panels, a plot management user interface configured to allow a user to divide a physical space of the indoor farming module into plots of various sizes, the plot management user interface comprising a zone identifier for specifying an area of the indoor farming module where each plot is located.

12. The method of claim 1, wherein the indoor farming module is one of a plurality of indoor farming modules and the method further comprises:
displaying on each panel of the plurality of panels a different indoor farming module of the plurality of indoor farming modules, each panel comprising at least one icon configured to access the plurality of schedules for a corresponding indoor farming module.

13. The method of claim 1, further comprising:
displaying a new schedule registration interface on the user interface, the new schedule registration interface configured to collect information for a new event for one schedule of the plurality of schedules;
send the information for the new event to the at least one controller of the indoor farming module; and
perform a new farming action based on the information for the new event using the at least one of the irrigation system, the lighting system and the air circulation system.

14. The method of claim 1, wherein the irrigation system comprises at least one valve, at least one stepper motor, and a plurality of liquid distribution tube assemblies, and the step of performing the at least one farming action comprises irrigating plants in the indoor farming module using the irrigation system.

15. The method of claim 1, wherein the lighting system comprises a photon source and at least one power source, and the step of performing the at least one farming action comprises controlling the at least one power source to provide a desired illumination to plants in the indoor farming facility.

16. The method of claim 1, wherein the air circulation system comprises an air flowing unit, an air conditioning unit, and an air dehumidifying unit, and the step of performing the at least one farming action comprises regulating an air flow to plants in the indoor farming facility.

* * * * *